(12) United States Patent
Randall

(10) Patent No.: US 11,840,120 B2
(45) Date of Patent: Dec. 12, 2023

(54) IFP SHOCK WITH AUTOMATICALLY ADJUSTABLE RIDE HEIGHT

(71) Applicant: Fox Factory, Inc., Duluth, GA (US)

(72) Inventor: Connor Randall, Salida, CO (US)

(73) Assignee: Fox Factory, Inc., Duluth, GA (US)

( * ) Notice: Subject to any disclaimer, the term of this patent is extended or adjusted under 35 U.S.C. 154(b) by 52 days.

(21) Appl. No.: 17/185,691

(22) Filed: Feb. 25, 2021

(65) Prior Publication Data

US 2021/0268860 A1 Sep. 2, 2021

Related U.S. Application Data

(60) Provisional application No. 62/982,645, filed on Feb. 27, 2020.

(51) Int. Cl.
*B60G 17/048* (2006.01)
*B60G 15/12* (2006.01)
*B63B 34/10* (2020.01)
*B60G 15/06* (2006.01)

(52) U.S. Cl.
CPC ........... *B60G 17/048* (2013.01); *B60G 15/12* (2013.01); *B60G 15/065* (2013.01); *B60G 2202/32* (2013.01); *B60G 2204/62* (2013.01); *B60G 2300/07* (2013.01); *B60G 2300/12* (2013.01); *B60G 2300/322* (2013.01); *B60G 2500/30* (2013.01); *B60G 2600/182* (2013.01); *B60G 2800/914* (2013.01); *B63B 34/10* (2020.02)

(58) Field of Classification Search
CPC .. B60G 17/048; B60G 15/12; B60G 2202/32; B60G 2204/62; B60G 2500/30; B60G 2800/914
See application file for complete search history.

(56) References Cited

U.S. PATENT DOCUMENTS

| 3,306,599 | A | * | 2/1967 | Fernand | B60G 13/14 188/269 |
| 3,847,410 | A | * | 11/1974 | Keijzer | B60G 17/048 280/6.159 |
| 3,986,118 | A | | 10/1976 | Madigan | |
| 5,351,790 | A | * | 10/1994 | Machida | B60G 13/003 188/266.2 |
| 5,952,823 | A | | 9/1999 | Sprecher et al. | |
| 6,676,119 | B2 | * | 1/2004 | Becker | B60G 17/0272 267/218 |
| 7,374,028 | B2 | | 5/2008 | Fox | |
| 8,627,932 | B2 | | 1/2014 | Marking | |
| 8,857,580 | B2 | | 10/2014 | Marking | |
| 9,033,122 | B2 | | 5/2015 | Ericksen et al. | |
| 9,120,362 | B2 | | 9/2015 | Marking | |

(Continued)

OTHER PUBLICATIONS

Extended European Search Report for EP Application 21160085.3, dated Aug. 6, 2021, 6 pages.

*Primary Examiner* — Frank B Vanaman

(57) ABSTRACT

A shock assembly with automatically adjustable ride height. The shock assembly includes a main chamber with a working fluid therein. A damping piston coupled to a piston shaft, the damping piston disposed in the main chamber to divide the main chamber into a compression side fluid chamber and a rebound side fluid chamber. An automatic ride height adjustment assembly including an internal floating piston (IFP) pump assembly and a spring preload piston assembly.

18 Claims, 9 Drawing Sheets

(56) References Cited

U.S. PATENT DOCUMENTS

| | | |
|---|---|---|
| 9,239,090 B2 | 1/2016 | Marking et al. |
| 9,353,818 B2 | 5/2016 | Marking |
| 10,933,710 B2 | 3/2021 | Tong |
| 2001/0032462 A1* | 10/2001 | Beck ........................ F16F 9/064 |
| | | 60/477 |
| 2006/0289258 A1* | 12/2006 | Fox ......................... F16F 9/512 |
| | | 188/316 |
| 2010/0140884 A1* | 6/2010 | Runkel ................... F16F 9/065 |
| | | 280/5.514 |
| 2015/0239526 A1* | 8/2015 | Ishikawa .............. B62K 25/283 |
| | | 280/6.152 |
| 2017/0057591 A1* | 3/2017 | Bender ................ B62K 25/283 |

\* cited by examiner

IFP SHOCK WITH AUTOMATICALLY ADJUSTABLE RIDE HEIGHT

CROSS-REFERENCE TO RELATED APPLICATIONS (PROVISIONAL)

This application claims priority to and benefit of co-pending U.S. Provisional Patent Application No. 62/982,645 filed on Feb. 27, 2020, entitled "AN IFP SHOCK WITH AUTOMATICALLY ADJUSTABLE RIDE HEIGHT" by Connor Randall, and assigned to the assignee of the present application, the disclosure of which is hereby incorporated by reference in its entirety.

FIELD OF THE INVENTION

Embodiments of the invention generally relate to methods and apparatus for use in vehicle suspension.

BACKGROUND OF THE INVENTION

Vehicle suspension systems typically include a spring component or components and a damping component or components that form a suspension to provide for a comfortable ride, enhance performance of a vehicle, and the like. For example, a hard suspension is important for a performance scenario while a soft suspension is better at providing a comfortable ride. However, in operation, the hardness or softness will change with the amount of weight being suspended. For example, a 100-pound rider on a motorcycle may have a shock set to a softer setting to provide a comfortable ride. However, when a 300-pound rider rides the same motorcycle with the same shock setting, the shock would likely have a much shorter length of available travel. Similarly, if the shock was set up for the heavier rider, it would be in an extremely hard setting if the vehicle was used by the lighter rider. Thus, the heavier rider would need to change components of (or the entirety of) the shock to obtain performance characteristics similar to the lighter rider and vice-versa.

Figure 1:
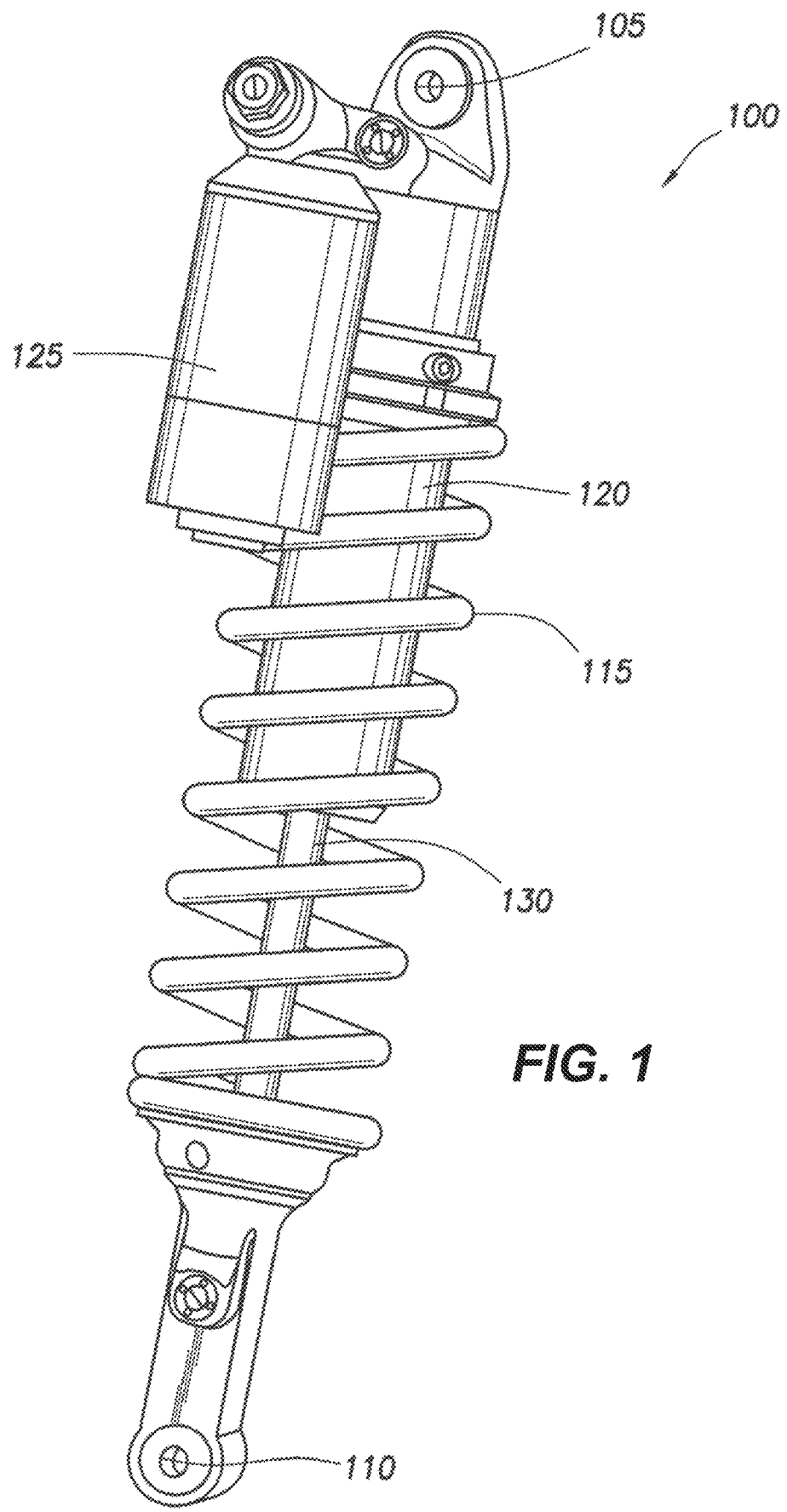
FIG. 1 is a perspective view of a shock assembly including a damper, external reservoir and helical spring, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Terms

In the following discussion, working fluid of "fluid" refers to a non-compressible fluid that is used in one or more aspects of the shock assembly. Examples of a non-compressible fluid include liquids such as oils, water, and the like. Compressible fluid refers to a fluid that is used in one or more aspects of the internal floating piston (IFP) assembly. Examples of compressible fluid includes gases such as nitrogen, carbon dioxide, air, and the like.

The term ride height refers to a distance between a portion of a vehicle and the surface across which the vehicle is traversing. For example, one or more suspension components will be coupled with a portion of a wheel(s) (or ski, track, hull, etc.) retaining assembly. In normal operation, the lowest point of the wheel will be in contact with the surface, while a shock assembly and/or other suspension components will be coupled between the wheel retaining assembly and the vehicle (often coupled with a portion of the vehicle frame). The ride height is established by the geometries of the shock assembly and/or other suspension components, the wheel retaining assembly, the wheel and tire profile, and the like.

Often, ride height can be based on one or more of a number of different measurements such as, but not limited to, a distance between a part the vehicle and the ground, a measurement between the top of a tire on the wheel and the wheel well there above, etc.

In the following discussion, the term initial SAG settings or "SAG" refers to a ride height based on the compression of one or more suspension dampers of the suspension system for a vehicle under its normal load configuration (e.g., with a rider/driver and any initial load weight). Once the SAG is established for a vehicle, it will be the designated ride height of the vehicle, until and unless the SAG is changed. Often, SAG is initially established by a manufacturer. For example, an unloaded motorcycle may have an initially assembled suspension ride height ranging from 30-38 inches from ground to saddle. The manufacturer will then set the manufacturer SAG for the vehicle based on a use category, a user weight/height range, the performance envelope, and the like.

In one embodiment, for example, the manufacturer could set the SAG for a 34-inch ride height (a middle of the performance envelope) based on a rider with a weight of 150 lbs. This would mean that unencumbered, the motorcycle would have a seat height that was higher than 34 inches of ride height (such as for example, a seat height of 38 inches). However, when a 150 lb. rider sits on the motorcycle, the suspension would compress and the motorcycle would be at the SAG ride height of 34 inches.

In one embodiment, an owner can modify the SAG to designate a new normal ride height. The SAG could be modified based on a vehicle use purpose, load requirements that are different than the factory load configuration, a change in tire size, a performance adjustment, aesthetics, a height of the user, and the like. For example, if the user wanted to have a lower ride height, they could reduce the SAG to 32 inches. In contrast, if the user wanted a higher ride height, they could increase the SAG to 36 inches.

In one embodiment, the owner could modify one or more suspension components to achieve the SAG. For example, if the rider weighed 180 lbs., when the rider sat on the motorcycle, the ride height would be lower than the 34 inches. As such, the rider would adjust one or more of the suspension components to return the motorcycle to the 34-inch SAG.

In one embodiment, the vehicle will have SAG settings resulting in a pre-established ride height. For example, a truck (side-by-side, car, or the like) may have a pre-established SAG based on an expected load (e.g., a number of passengers, cargo requirements, etc.

Regardless of the vehicle type, in a static properly loaded situation, the ride height of the vehicle should be at or about the SAG. In contrast, while in motion, the ride height will change as the vehicle travels over the surface, and while the suspension system is used to reduce the transference of any input forces received from the surface to the rest of the vehicle, another goal of the suspension system is to continually attempt to return the vehicle to its proper SAG.

However, when additional weight is added to the vehicle, the suspension and/or shock assembly will be compressed, and the vehicle ride height will be less than the SAG.

For example, if a vehicle is loaded with an additional 500 lbs. of cargo in the rear, the extra 500-pound load will cause shock assembly compression (and the like) thereby causing the vehicle to ride lower in the rear. In general, this lower rear ride height, or compressing of the rear suspension, will move the vehicle out of SAG and change the vehicle geometry, e.g., cause a slant upward from rear to front. While the vehicle sensors described herein can identify the out of SAG situation, often, these changes can also be visually identified by a reduction in space between the wheel and the wheel well of the rear wheel as compared to space between the front wheels and wheel wells on the vehicle, or by the angle of the vehicle.

In one embodiment, the additional load will reduce the available operating length of one or more suspension components which can be detrimental to steering and performance characteristics, could cause an unwanted impact between wheel (or wheel suspension) and frame, increase the roughness of the ride, increase suspension stiffness, result in suspension bottom out, loss of control, tire blow out, and the like.

In one embodiment, when the weight is added to the vehicle, if it is not centered, it will not only cause a change in the front or rear SAG (depending upon the load location fore or aft), but will also cause SAG changes that will differ between the left and right side of the vehicle (again depending upon the load location and this time whether the load is heavier on the right or left side of the vehicle centerline).

For example, if the load is in the rear and off-center to the left, the load-modified ride-height of the vehicle will be lopsided. That is, not only will the rear of the vehicle be lower than the front, but the left-side suspension will also be compressed more than the right-side suspension causing the rear left of the vehicle to have a lower ride-height than the other three corners.

Thus, while the entire rear of the vehicle will be out of SAG and therefore riding lower than the front of the vehicle, it will also be lopsided between the left and right sides. Such lopsided suspension characteristics can be extremely deleterious while driving and will often result in a number of issues including, but not limited to: steering problems, suspension bottom out, loss of control, tire blowout, and vehicle rollover.

Overview

The present embodiments utilize a fluid chamber in the suspension to allow the ride height to be changed back toward the SAG while on the fly, e.g., while the vehicle is in operation.

In general, in a shock assembly with an internal floating piston (IFP), the IFP is used in the damper chamber to keep different fluids separate from one another. For example, in one embodiment, the IFP 318 keeps the oil separate from the nitrogen. In one embodiment, ride height adjustment is automatically made by utilizing a pump in an internal floating piston (IFP) shock configuration to adjust the amount of fluid within the fluid chamber of the spring preload piston assembly while the suspension is in operation. In general, when fluid is added to the fluid chamber the length of the spring preload piston assembly (and thus the length of the shock assembly) is increased causing an increase in ride height. In contrast, when fluid is removed from the fluid chamber, the length of the spring preload piston assembly (and thus the length of the shock assembly) is reduced causing a decrease in ride height. In one embodiment, ride height is set by changing the location of the pump head with respect to the IFP.

In one embodiment, the system can be passive and/or semi-active. For example, in the passive case, the preload system bleeds to a fluid reservoir through a tunable orifice. In the semi-active case, a pressure relief valve sets ride height and allows for rapid fluid dump (e.g., providing a large fluid path for the release of fluid from the fluid chamber to reduce the length of the spring preload piston assembly and lowering the vehicle) or system lockout to prevent system bleed down (e.g., maintaining the fluid in the fluid chamber to maintain the length of the spring preload piston assembly, and thus the ride height while the vehicle is parked, stopped, or the like). In one embodiment, the spring preload piston assembly reduces and/or eliminates a possibility of rebound adjustment. In one embodiment, the spring preload piston assembly provides no, or a very small change, to the damping values for different preloads.

Discussion

FIG. 1 includes a helical spring 115, a damper housing 120 with a piston and chamber (shown in further detail herein), an upper eyelet 105, a lower eyelet 110, and an external reservoir 125 having a floating piston and pressurized gas to compensate for a reduction in volume in the main damper chamber of the shock assembly as the shaft 130 moves into the damper body. Fluid communication between the main chamber of the damper and the external reservoir 125 may be via a flow channel including an adjustable needle valve. In its basic form, the damper works in conjunction with the helical spring and controls the speed of movement of the piston shaft by metering incompressible fluid from one side of the damper piston to the other as the damper travels through the main chamber, and additionally metering fluid flow from the main chamber to the reservoir, during a compression stroke and a rebound stroke.

In one embodiment, the upper eyelet 105 and lower eyelet 110 are used for mounting one end of the shock assembly to a static portion of the vehicle and the other end of the shock assembly to a dynamic portion of the wheel(s) (or ski, track, hull, etc.) retaining assembly. Although eyelets are shown, it should be appreciated that the mounting systems may be bolts, welds, or the like, the use of eyelets is provided as one embodiment and for purposes of clarity.

Although the eyelets are labeled as upper eyelet 105 and lower eyelet 110, this is providing as one embodiment, and for purposes of defining relative motion of one or more of the components of shock assembly 100. Thus, it should be appreciated that in one embodiment, (such as an inverted scenario) the mounting of shock assembly 100 could be with the upper eyelet 105 being at a lower point (such as closer to the wheel retaining assembly) while the lower eyelet 110 would actually be at a higher point on the vehicle than upper eyelet 105 (e.g., such as at the frame of the vehicle).

It should be appreciated that the automatically adjustable ride height capability discussed herein could be incorporated into a shock assembly 100 such as shown in FIG. 1, or in another embodiment, into a shock assembly with more, fewer, or different components than those shown in FIG. 1. For example, in one embodiment, the shock assembly 100 will not have a remote external reservoir 125.

Further, the automatically adjustable ride height capability disclosed herein could be used on one or more shock assemblies of different types, and in an assortment of vehicles such as, but not limited to a bicycle, motorcycle, ATV, jet ski, car, snow mobile, side-by-side, and the like.

Figure 2A:
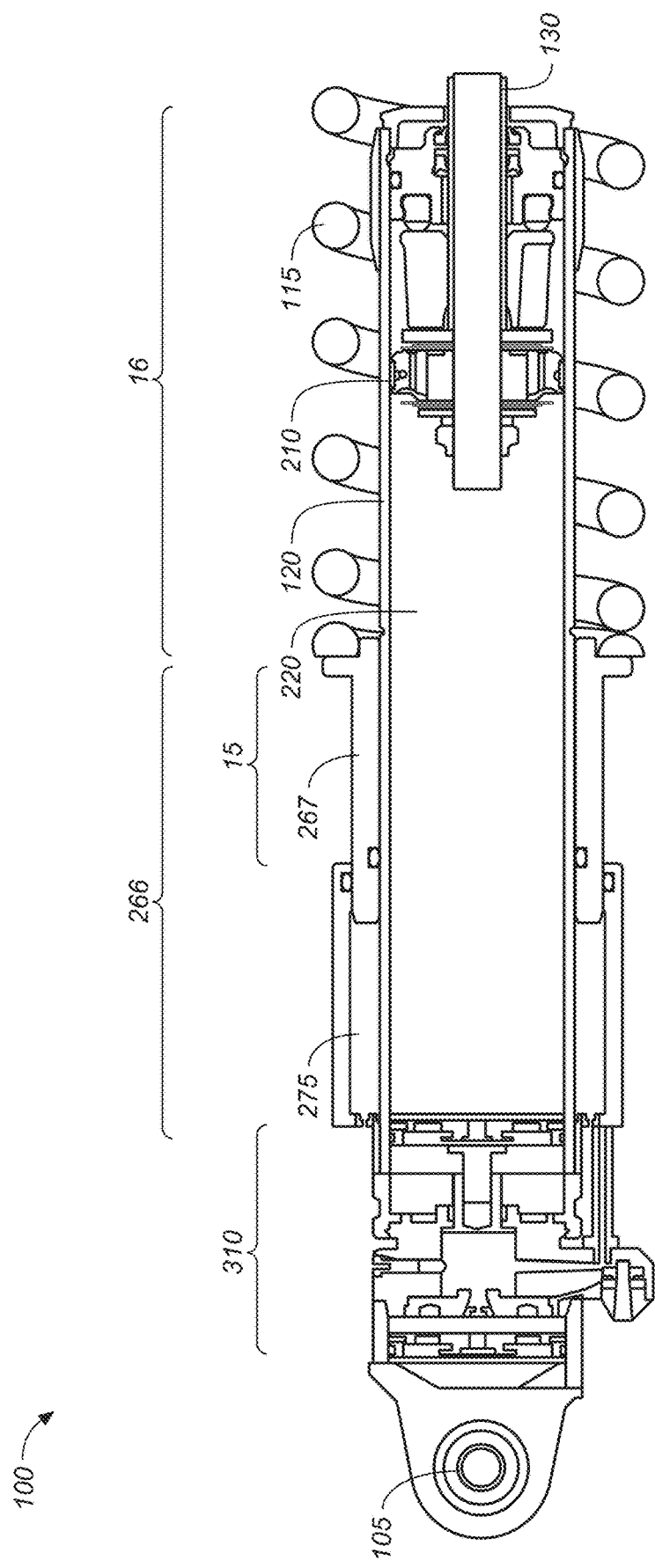
FIG. 2A is a section view showing a shock assembly with an automatic ride height adjustment assembly, in accordance with an embodiment.

FIG. 2A is a section view of shock assembly 100 with an automatic ride height adjustment assembly as shown in accordance with an embodiment. In one embodiment, section view 2A includes some or all of the components described in FIG. 1 and discloses one or more additional components that are visible in the section view.

In one embodiment, shock assembly 100 includes main chamber 220 within damper housing 120 (of FIG. 1), a damping piston 210 fixed to shaft 130, a spring preload piston assembly 266, and an optional external reservoir 125.

In one embodiment, the damping piston 210 and shaft 130 are axially movable within main chamber 220 toward or away from upper eyelet 105. For example, during a compression stroke the damping piston 210 and shaft 130 move axially through main chamber 220 toward upper eyelet 105. In contrast, during a rebound stroke, the damping piston 210 and shaft 130 move axially through main chamber 220 away from upper eyelet 105.

Figure 2B:
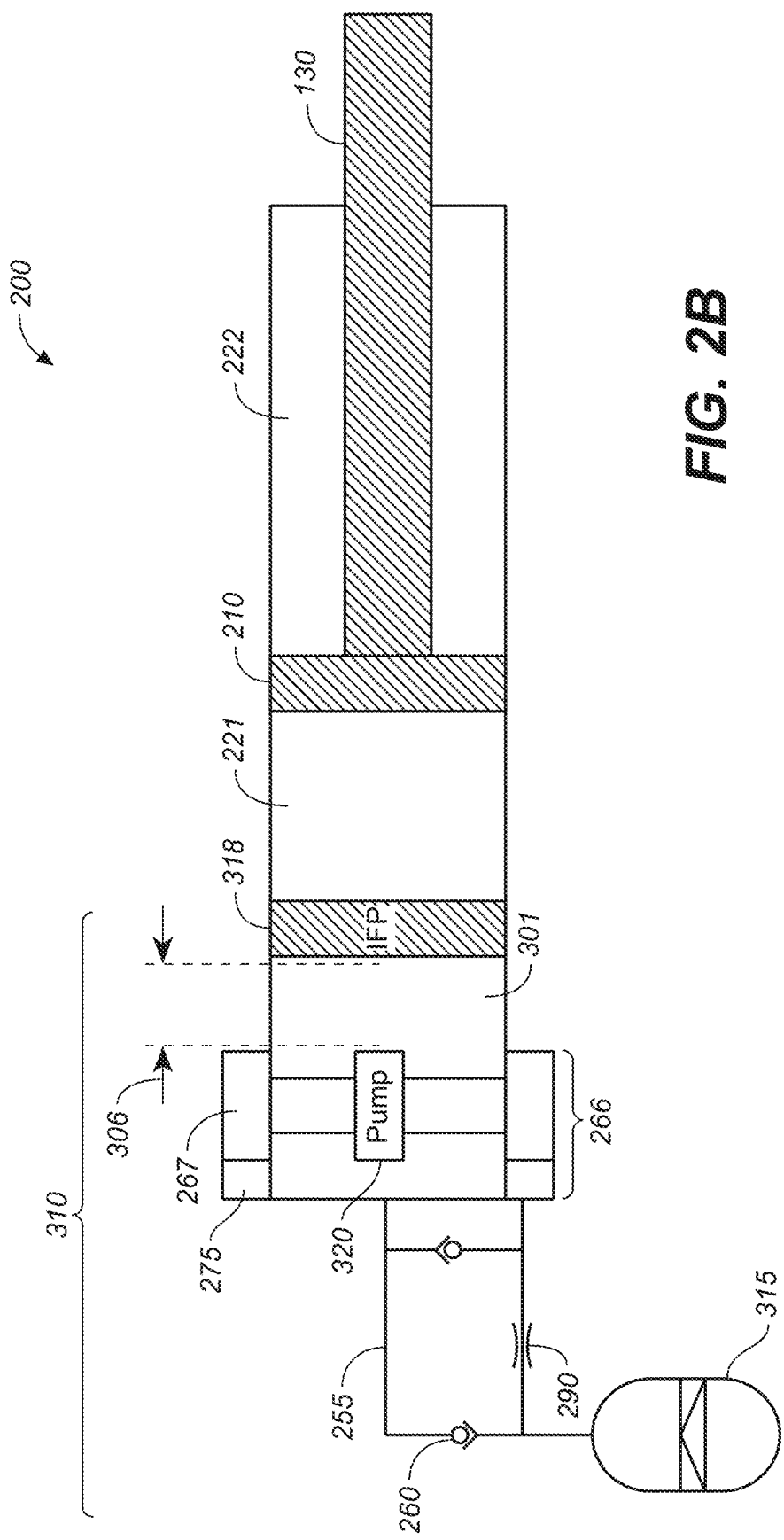
FIG. 2B is a schematic diagram of the automatic ride height adjustment assembly in a monotube shock, in accordance with an embodiment.

In one embodiment, the damping piston 210 divides the main chamber 220 into a compression side 221 and a rebound side 222 (as shown in FIG. 2B). Thus, while the size of the main chamber 220 will remain static, the size of both the compression side 221 and the rebound side 222 will dynamically change depending upon the location of the damping piston 210 within the main chamber 220.

In one embodiment, the damping piston 210 is equipped with fluid paths therethrough to permit damping fluid within the main chamber 220 to be metered therethrough during the compression and/or rebound movement. For example, in the compression stroke, at least a portion of fluid within main chamber 220 utilizes the fluid paths through damping piston 210 to move from a compression side 221 of main chamber 220 to the rebound side 222 of the main chamber 220. In contrast, during a rebound stroke, at least a portion of fluid within main chamber 220 utilizes the fluid paths through damping piston 210 to move from the rebound side 222 to the compression side 221.

In one embodiment, shock assembly 100 can also include one or more bypasses that allow fluid to flow around the piston between the compression side 221 and the rebound side 222 of the main chamber 220 during at least a portion of the compression and/or rebound stroke. Additional information regarding the configuration and operation of a bypass is described in U.S. Pat. No. 8,857,580 which is entirely incorporated herein by reference.

Figure 2C:
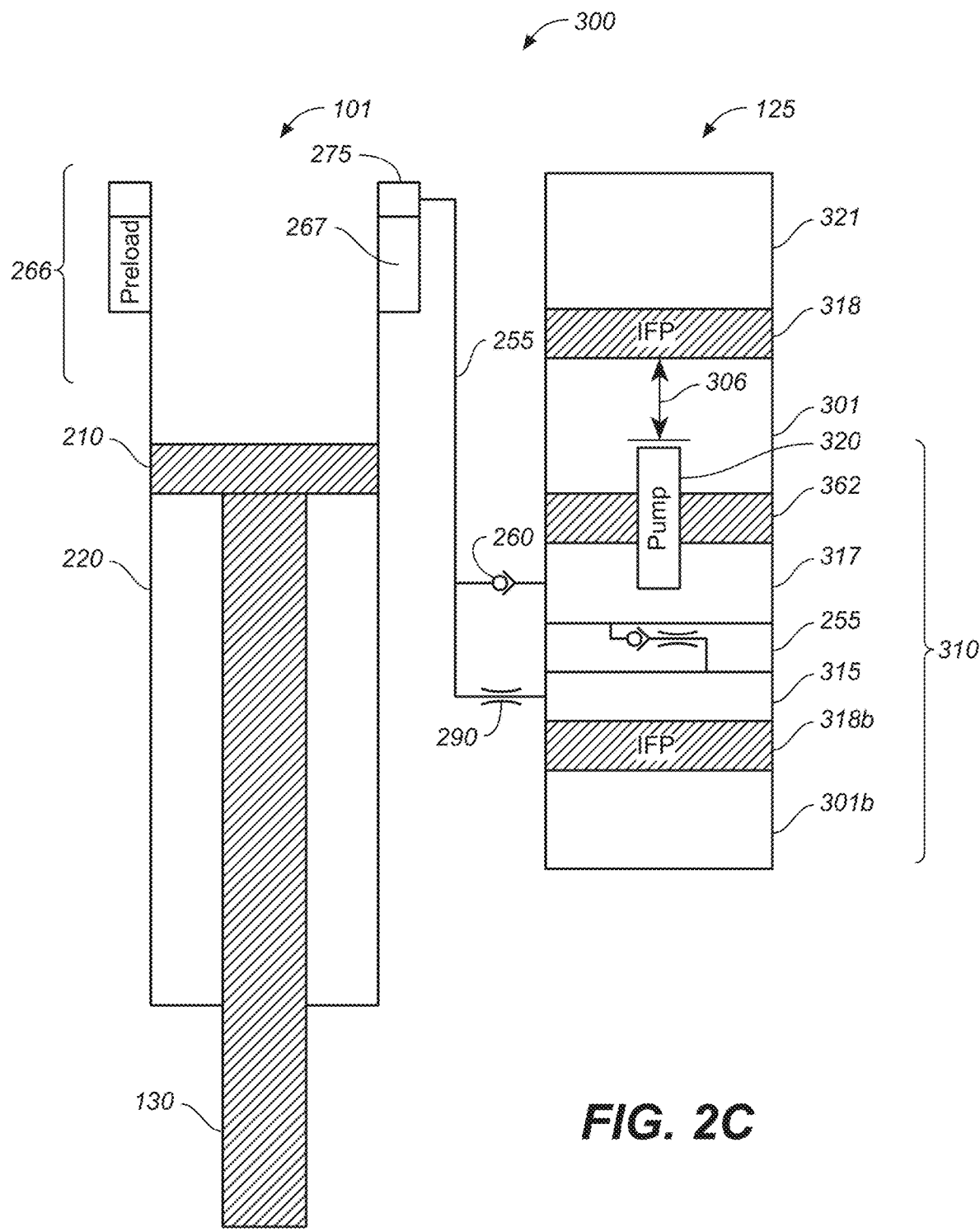
FIG. 2C is a schematic diagram of the automatic ride height adjustment assembly in a piggyback shock setup with a remote reservoir in accordance with an embodiment.

In one embodiment where there is an external reservoir 125, such as in FIGS. 1 and 2C, during at least a portion of the compression and/or rebound stroke fluid can also move through a flow path from the main chamber 220 into the external reservoir 125. A configuration including a description of an external reservoir, is described in U.S. Pat. No. 7,374,028 which is entirely incorporated herein by reference.

In one embodiment, the ride height adjustment assembly includes components such as, an IFP pump assembly 310 and a spring preload piston assembly 266 and is described in more detail herein.

Spring Preload Piston Assembly

In one embodiment, spring preload piston assembly 266 includes a fluid chamber 275 that is fixed with respect to damper housing 120 and a spring retainer 267 which is moveable axially along the length of damper housing 120. In one embodiment, fluid can enter or leave fluid chamber 275 via fluid paths and fluid pumps discussed in the IFP pump assembly 310 discussion herein.

In one embodiment, when the amount of fluid in fluid chamber 275 changes, the exposed length 15 of spring retainer 267 also changes thereby changing the length of the spring preload piston assembly 266. This change in the length of spring preload piston assembly 266 will result in a change in the overall length of shock assembly 100 resulting in a change to the ride height.

For example, when fluid is pumped into fluid chamber 275, spring retainer 267 is hydraulically pushed axially along the damper housing 120 toward lower eyelet 110 increasing the exposed length 15 of spring retainer 267. This increase in the exposed length 15 of spring retainer 267 will result in an increase in the overall length of the spring preload piston assembly 266.

In one embodiment, increasing the length of the spring preload piston assembly 266 will increase the overall length of shock assembly 100 resulting in a ride height increase. In one embodiment, since the ride height increase is based on the overall lengthening of shock assembly 100, any damping settings and/or the preload of shock assembly 100 will either not be affected or only be slightly affected. As such, the performance of the shock assembly 100 will also remain relatively unmodified.

In contrast, when fluid is released from fluid chamber 275, spring retainer 267 would move axially along the damper housing 120 toward upper eyelet 105 and into the fluid chamber 275 reducing the exposed length 15 of spring retainer 267. In one embodiment, spring retainer 267 would move into fluid chamber 275 by the contraction of fluid chamber 275. In one embodiment, the contraction of fluid chamber 275 is caused by the IFP pump assembly 310 removing fluid from fluid chamber 275. In one embodiment, the movement of spring retainer 267 into fluid chamber 275 is caused by the force of spring 115 acting on spring retainer 267.

In one embodiment, the decrease in the exposed length 15 of spring retainer 267 will cause a decrease in the overall length of the spring preload piston assembly 266. The decrease in the length of the spring preload piston assembly 266 will result in a decrease of the overall length of shock assembly 100 resulting in a ride height reduction. In one embodiment, since the ride height reduction is based on the reduction to the overall length of shock assembly 100, any damping settings and/or the preload of shock assembly 100 will either not be affected or only be slightly affected. As such, the performance of the shock assembly 100 will also remain relatively unmodified.

Referring now to FIG. 2B, a schematic diagram 200 of the automatic ride height adjustment assembly in a monotube shock is shown in accordance with an embodiment. In one embodiment, schematic diagram 200 includes main chamber 220 divided by the damping piston 210 to form a compression side 221 fluid chamber and a rebound side 222 fluid chamber. In one embodiment, schematic diagram 200 includes the ride height adjustment assembly including the IFP pump assembly 310 and the spring preload piston assembly 266.

In one embodiment, the IFP pump assembly 310 includes components such as, bleed control valve 390, a fluid reservoir 315, a relief valve 290, fluid flow path(s) 255, check valve(s) 260, an IFP fluid chamber 301 having a pump 320 therein, an IFP 318 separating the compression side 221 fluid chamber from the IFP fluid chamber 301 and a distance 306 that is the distance between the IFP 318 and the pump 320. In one embodiment, the IFP pump assembly 310 is used to fill and/or empty the fluid chamber 275 of spring preload piston assembly 266.

In one embodiment, fluid flow path 255 is shown between fluid reservoir 315 and fluid chamber 275 of spring preload piston assembly 266. In one embodiment, check valve 260 is a ball spring check valve. However, it should be appreciated that check valve 260 could be another type of valve such as an intelligent quick switch (IQs) such as a stepper motor adjustable valve, an electronic valve, a gate valve, or the like.

In one embodiment, the check valve 260 either allows fluid flow in both directions (e.g., open) or only allows fluid to flow in one direction (e.g., closed). In so doing, even if the check valve 260 is closed, when the shock assembly 100 is under significant load changes, the fluid flow is only closed in the direction of stopping fluid flow out of fluid chamber 275. Thus, in one embodiment, even when the check valve 260 is closed, the fluid can be pumped from fluid reservoir 315 into fluid chamber 275.

In one embodiment, relief valve 290 is configured to provide a fluid dump or rapid release of fluid from fluid chamber 275. In one embodiment, the fluid relief valve 290 provides the working fluid released from fluid chamber 275 to the fluid reservoir 315 when blow-off occurs.

Referring now to FIG. 2C, a schematic diagram 300 of the automatic ride height adjustment assembly in a shock assembly 100 and a remote reservoir 125 is shown in accordance with an embodiment. In one embodiment, the ride height adjustment assembly includes the IFP pump assembly 310 and the spring preload piston assembly 266.

In one embodiment, the components of the IFP pump assembly 310 are similar in FIGS. 2B and 2C with the difference being in the location of the IFP pump assembly 310 (e.g., in the monotube shock of FIG. 2B, and in the remote reservoir 125 of FIG. 2C). In other words, in contrast to the location of the IFP pump assembly 310 of FIG. 2B, in schematic diagram 300, the IFP pump assembly 310 is located in the external reservoir 125.

In one embodiment, during at least a portion of the compression and/or rebound stroke fluid will move through a flow path from the main chamber 220 into the external reservoir 125. In general, the external reservoir 125 will include a fluid chamber 321 for receiving the working fluid from the main chamber 220, a compressible fluid chamber 301 (filled with a compressible fluid, such as for example, Nitrogen), and a reservoir IFP 318 to keep the working fluid separate from the compressible fluid in compressible fluid chamber 301.

In one embodiment, the IFP pump assembly 310 is located below the compressible fluid chamber 301 of remote reservoir 125. For example, IFP pump assembly will include a housing 362 with a pump 320 extending therethrough. One portion of pump 320 will be located within the compressible fluid chamber 301 a distance 306 from the reservoir IFP 318. The other side of pump 320 will extend from housing 362 into compressible fluid chamber 317 which will include fluid flow path 255, check valve(s) 260, and a relief valve 290 (or a bleed control valve 390 discussed herein) configured to provide a fluid dump or rapid release of fluid from fluid chamber 275.

In one embodiment, the bleed control valve and/or relief valve provides the working fluid released from fluid chamber 275 to the fluid reservoir 315 when blow-off (or a rapid release) occurs. In one embodiment, the bleed control valve and/or the relief valve can be the same type of valve or different types of valves. In one embodiment, either or both the bleed control valve and/or the relief valve can be a solenoid valve, a mechanical valve, or the like for use in a semi-active version.

In one embodiment, instead of a bleed orifice or relief valve, the IFP pump 320 may be engaged with the IFP 318 so it would act as a continuous pump that can regulate the flow with the valve (dump rapidly, etc) as described in greater detail in the "Bleed Control Valve Operation" section.

In one embodiment, the IFP pump assembly 310 will include another compressible fluid chamber 301b which will be separated from the non-compressible working fluid in fluid reservoir 315 by second IFP 318b.

In one embodiment, by locating the IFP pump assembly 310 in the remote reservoir 125, the ride height adjustment feature can be retroactively applied to any shock that can use a remote reservoir 125. In one embodiment, the ride height adjustment feature will work with all shock architectures.

Figure 3A:
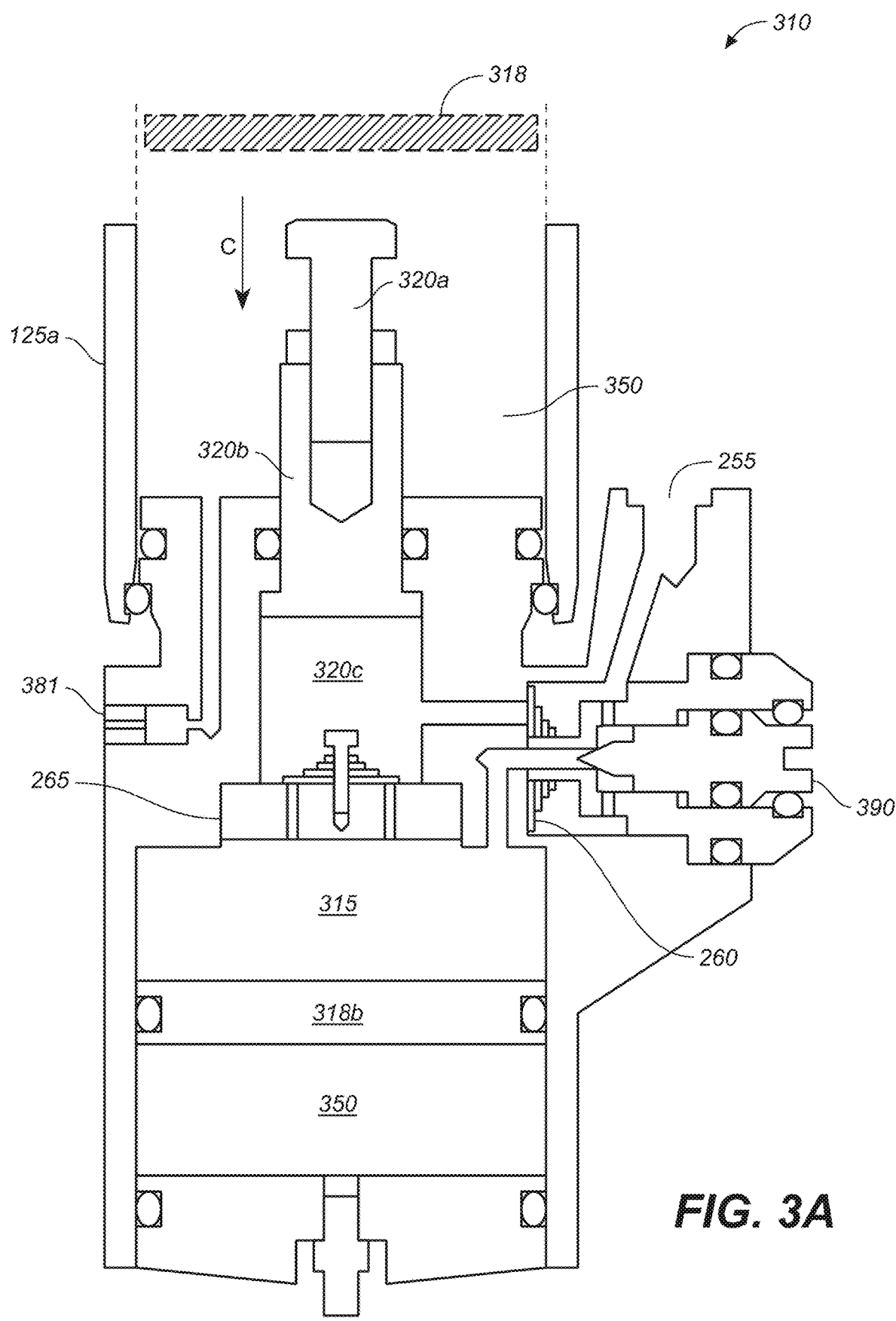
FIG. 3A is a schematic view of the IFP pump assembly, in accordance with an embodiment.

Referring now to FIG. 3A, a schematic view of the IFP pump assembly 310 shown in accordance with an embodiment. In one embodiment, IFP pump assembly 310 includes a compressible fluid port 381, compressible fluid chamber 301, pump 320 shown with a number of parts, e.g., a post 320a to engage the IFP 318, a fluid pump body 320b, and a fluid pump chamber 320c. In one embodiment, IFP pump assembly 310 also includes fluid reservoir 315, the second IFP 318b, the second compressible fluid chamber 301b, check valve 260, a bleed control valve 390, fluid flow path 255 (to spring preload piston assembly 266), a fluid pathway 125a (to external fluid reservoir 125), and check tunable orifice 265.

In one embodiment, post 320a sets the distance 306 between the pump and the IFP 318. In one embodiment, post 320a is fixedly coupled with fluid pump body 320b. In one embodiment, post 320*a* is adjustably coupled with fluid pump body 320*b* and once the distance 306 is set the post 320*a* will become fixedly coupled with fluid pump body 320*b*.

As such, in one embodiment of a compression stroke (shown and described in more detail herein at FIG. 3B) when IFP 318 contacts post 320*a* both the post 320*a* and fluid pump body 320*b* will be pushed in direction C (e.g., compressed). This will cause fluid pump body 320*b* to move into fluid pump chamber 320*c* thereby causing the working fluid in fluid pump chamber 320*c* to be pumped through fluid flow path 255 and into spring preload piston assembly 266.

In contrast, in one embodiment of a rebound stroke (shown and described in more detail herein at FIG. 3C) when IFP 318 moves away from post 320*a* (e.g., in a direction opposite to direction C) both the post 320*a* and fluid pump body 320*b* will also move in a rebounding direction (e.g., the direction opposite to direction C). This will cause fluid pump body 320*b* to withdraw from fluid pump chamber 320*c* allowing working fluid to refill the fluid pump chamber 320*c*.

In one embodiment, the fluid pump chamber 320*c* will be refilled from some amount of fluid drawn back from fluid flow path 255 and from the fluid in fluid reservoir 315 via check tunable orifice 265. In one embodiment, the fluid pump chamber 320*c* will only be refilled from the fluid in fluid reservoir 315 via check tunable orifice 265.

In one embodiment, the distance 306 between post 320*a* and the IFP 318 is set based on the proper SAG of the vehicle. For example, when the vehicle is in the proper SAG configuration and load, the post 320*a* will be in a location such that the normal operation of the shock assembly 100 will provide little to no interactions between IFP 318 and post 320*a* to keep the length of spring preload piston assembly 266 relatively constant.

In contrast, when the vehicle is loaded with extra weight, the vehicle will be riding low (e.g., below the established SAG) and the IFP 318 will contact post 320*a* during some or all of the compression stroke. As such, when the vehicle is riding low, the IFP pump assembly 310 will be pumping fluid into spring preload piston assembly 266 which will increase the overall length of spring preload piston assembly 266 and shock assembly 100 which will increase the vehicle ride height.

In one embodiment, when the vehicle is lightly loaded (or when the extra weight is removed, the vehicle will be riding high (e.g., above the established SAG) and the IFP 318 will not be contacting post 320*a*. As such, when the vehicle is riding high, the bleed control (either passive or semi-active as described herein) will allow fluid flow out of spring preload piston assembly 266. The reduction of fluid in spring preload piston assembly 266 will reduce the length of spring preload piston assembly 266 which will reduce the overall length of spring preload piston assembly 266 and shock assembly 100 which will reduce the vehicle ride height.

In one embodiment, check tunable orifice 265 is used to control flow of the non-compressible working fluid from fluid reserve 315 into fluid pump chamber 320*c*. In one embodiment, check tunable orifice 265 is used to tune the limit of reflow on consecutive hits (or pump activations). For example, if the check tunable orifice 265 is tuned to fill slowly, then if a number of compression strokes are quickly made, the first compression stroke would pump a large amount of fluid from fluid pump chamber 320*c* into spring preload piston assembly 266. However, the next few quick compression strokes would find a lesser amount of fluid in fluid pump chamber 320*c* due to the flow restrictions from fluid reservoir 315 into fluid pump chamber 320*c*. In one embodiment, by adjusting the check tunable orifice 265, the encounter of a rumble strip (or the like) would not cause an over-pumping situation into spring preload piston assembly 266.

In one embodiment, the compressible fluid is Nitrogen, air, or the like. In one embodiment, the working fluid is a non-compressible hydraulic fluid.

Figure 3B:
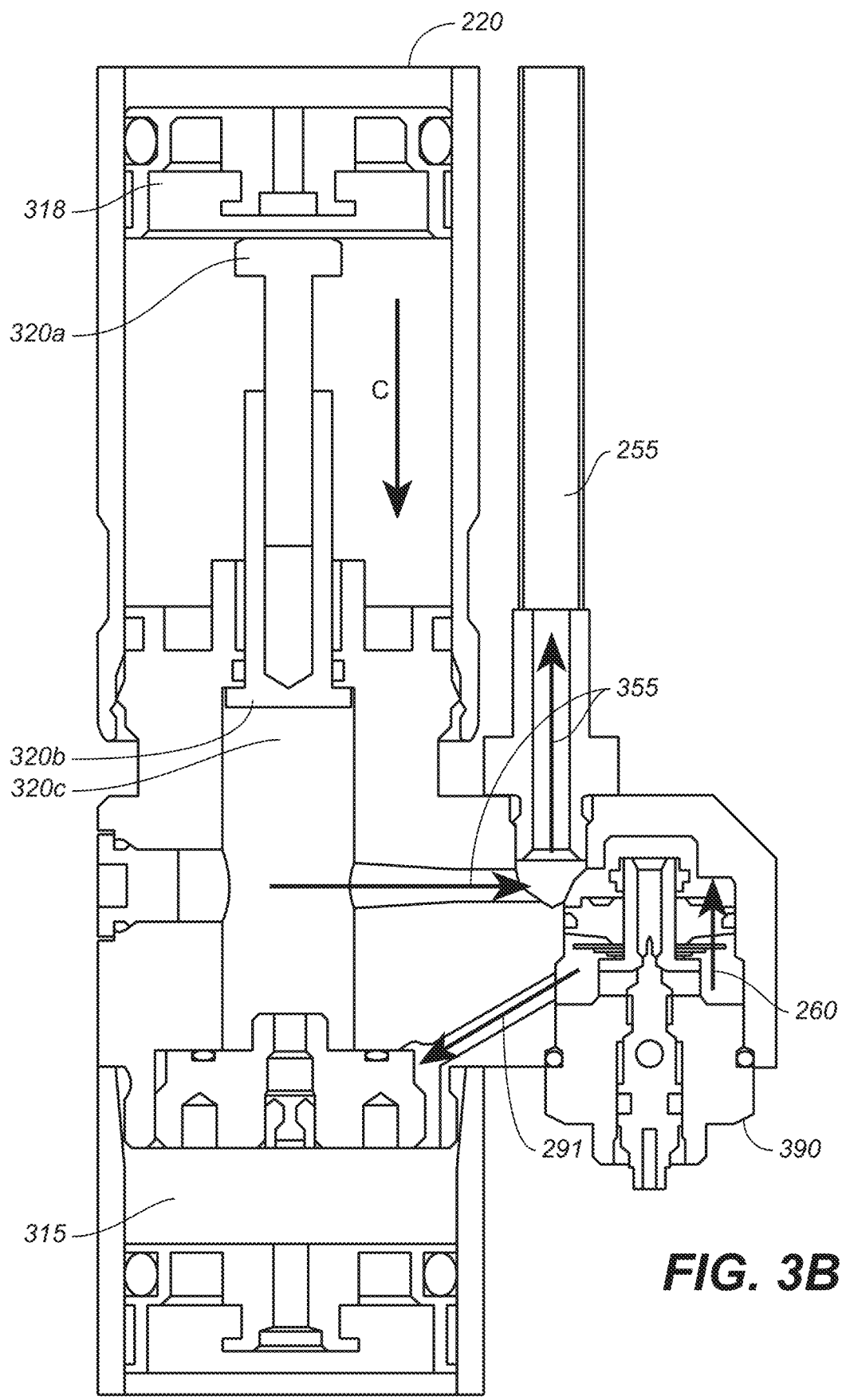
FIG. 3B is a section view of the automatic ride height adjustment assembly with a focus on the IFP pump assembly in compression, in accordance with an embodiment.

Referring now to FIG. 3B, a section view of the automatic ride height adjustment assembly with a focus on the IFP pump assembly 310 operating in a compression stroke is shown in accordance with an embodiment. In general, the components are the same in FIG. 3A with the difference being in the flow direction and/or paths taken by the fluid. As such, the discussion of FIGS. 3B and 3C will focus on the movement and flow directions of the components shown and discussed with respect to FIG. 3A.

In one embodiment of a compression stroke, when IFP 318 contacts post 320*a* both the post 320*a* and fluid pump body 320*b* will be pushed in direction C. This will cause fluid pump body 320*b* to move into fluid pump chamber 320*c* thereby causing the working fluid in fluid pump chamber 320*c* to be pumped through fluid pathway 255 as shown by arrows 355 and into fluid chamber 275 of spring preload piston assembly 266.

In one embodiment, check valve 260 will keep the flow from returning from spring preload piston assembly 266 until an adjustment (either a passive or semi-active adjustment) is made to bleed control valve 390. In one embodiment, if there is a relief flow from the relief valve 290, it will follow relief flow path 291 back to fluid reservoir 315.

Figure 3C:
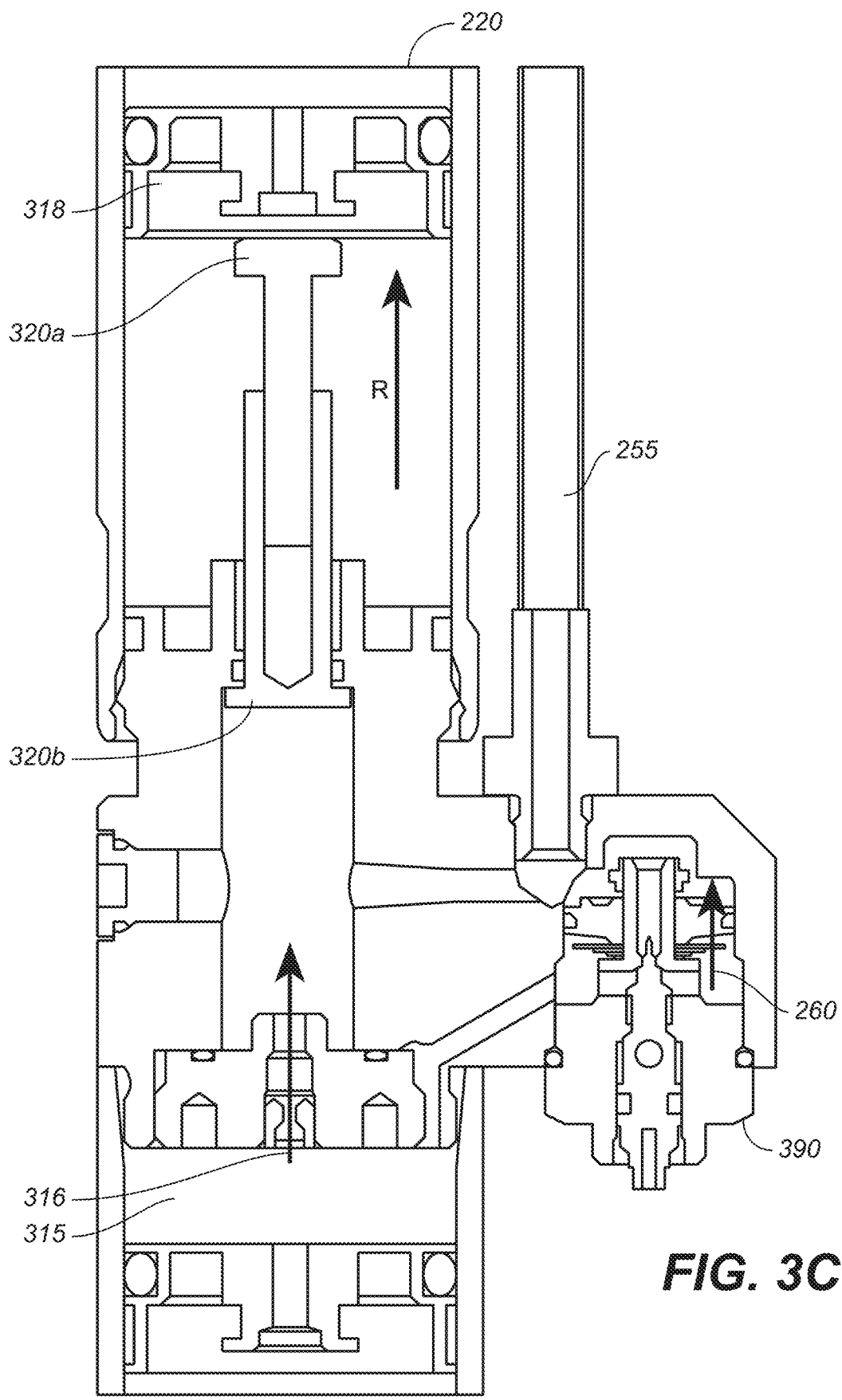
FIG. 3C is a section view of the automatic ride height adjustment assembly with a focus on the IFP pump assembly in rebound, in accordance with an embodiment.

In FIG. 3C, a section view of the automatic ride height adjustment assembly with a focus on the IFP pump assembly 310 operating in rebound is shown in accordance with an embodiment.

In one embodiment of a rebound stroke when IFP 318 moves away from post 320*a*, e.g., in direction R, both the post 320*a* and fluid pump body 320*b* will also move in a rebounding direction (e.g., the direction opposite to direction C). This will cause fluid pump body 320*b* to withdraw from fluid pump chamber 320*c* allowing working fluid to refill the fluid pump chamber 320*c*.

In one embodiment, the fluid pump chamber 320*c* will be refilled from some amount of fluid drawn back from fluid flow path 255 and from the fluid path 316 that flows from fluid reservoir 315 via check tunable orifice 265. In one embodiment, the fluid pump chamber 320*c* will only be refilled from the fluid path 316 that flows from fluid reservoir 315 via check tunable orifice 265.

In one embodiment, check valve 260 will keep the flow from returning from spring preload piston assembly 266 until an adjustment (either a passive or semi-active adjustment) is made to bleed control valve 390.

In one embodiment, the ride height adjustment feature does not change the damping values for different preloads (e.g., part of the initial SAG settings). For example, the pump 320 will cause the suspension to rise by pumping the fluid into the fluid chamber 275 causing the fluid chamber 275 to expand and move the spring retainer 267 to adjust the suspension back toward the correct geometric ride height (e.g., the established SAG for the vehicle). While this adjustment will not relieve the load on the now somewhat compressed helical spring 115, it will also not increase the pressure in the damping chamber. As such, the operation of the damping chamber in both rebound and compression, to include the fluid pressures in the damping chamber, would not be affected by the automatic ride height adjustment.

Bleed Control Valve Operation

In one embodiment, using the semi-active configuration of bleed control valve 390, the fluid can be dumped from the fluid chamber 275 to allow a vehicle to drop to a lower height. For example, as a vehicle is loaded with extra weight, the ride height would be lowered due to the extra weight, but once the vehicle was put into motion the automatic ride height adjustment will return the vehicle ride height back to the established SAG for the vehicle, e.g., by adding fluid to the fluid chamber 275. In one embodiment, when the vehicle is stopped (or parked for an amount of time), the semi-active system would maintain the correct ride height by locking out the flow from fluid chamber 275 to prevent ride height bleed down.

However, in one embodiment, when the vehicle is stopped and is ready to be unloaded, the semi-active pressure release could be used to release the fluid from fluid chamber 275 causing the suspension height to return to the lowered state.

Thus, during loading—the suspension would be lowered (e.g., moving a wheel well closer to the tire), during vehicle operation—the automatic ride height adjustment would automatically return the ride height to SAG (e.g., moving the wheel well back away from the tire), and then once the vehicle was stopped, the semi-active system would maintain the ride height by locking out the system. However, if it were time to unload, or otherwise desired, the semi-active bleed control valve 390 would release the fluid from fluid chamber 275 which would return the vehicle to the lowered suspension state.

In one embodiment, a passive version of bleed control valve 390 could be used on a motorcycle suspension to allow a rider to lower the ride height at any time (or a number of different times) on a given ride. For example, the rider could have a ride height setting (e.g., an established riding SAG) that is good for riding, but a bit high when the bike is stopped (such as at a light, stop sign, being parked, etc.). By using a passive bleed control valve 390, the rider could release the fluid from fluid chamber 275 and lower the ride height manually when the bike is stopped. In one embodiment, the rider might even utilize two different SAG settings, e.g., a riding SAG, and a lower stopped SAG.

In one embodiment, the semi-active version of bleed control valve 390 would automatically adjust the ride height via a motion sensing system, where the ride height would be automatically lowered when a stop in forward motion was detected. For example, in the automated setup, the monitoring system could release the fluid from fluid chamber 275 when the bike is slowing, when the bike is stopped, after the bike is stopped for a given period of time, when the bike is stopped for a given period of time and the throttle is also not engaged, when the bike is stopped and is also taken out of gear, turned off, and the like.

In one embodiment, the system automation could include terrain: E.g., on a road at a stop or when the vehicle drops below x-miles per hour; off-road when the vehicle is stopped and the clutch is engaged; off-road when the vehicle is stopped and the throttle is disengaged; off-road when the vehicle is stopped and the vehicle gearbox is in neutral; etc. Although a motorcycle is used in the example, the same operation could be performed in any number of different vehicles.

In one embodiment, the passive and/or semi-active configuration can be used to release the fluid from fluid chamber 275 and lower the vehicle to allow for easier exit, entrance or the like. For example, in one embodiment, bleed control valve 390 could be used to dump the fluid out of the fluid chamber 275 and lower the vehicle for an extended period of time, even while the vehicle is in operation, to reduce the ride height for purposes such as overhead clearance and the like. For example, if the vehicle is a loaded cargo van, the bleed control valve 390 could be used to change the ride height of the van could from the SAG to the lower ride height while moving through an underpass, an overhang, a parking garage, and the like. Moreover, once the height limiting obstacle has been cleared, the bleed control valve 390 could be passive and/or semi-actively reengaged thereby causing the automatic ride height system to return the vehicle to its SAG.

In one embodiment, since the working fluid is pulled from fluid reservoir 315, the automatic ride height adjustment system will not pull oil from the main chamber 220 of shock assembly 100. As such, the operation of the damping portion of shock assembly 100 will not be affected by the fluid that is pumped into or released from the fluid chamber 275.

Setting The Distance Between Pump And IFP

In one embodiment, the distance 306 between the IFP 318 and the pump 320 is preset at the factory. In one embodiment, the distance 306 between the IFP 318 and the pump 320 is user adjustable to set a SAG ride height. For example, as shown in FIGS. 3A-3C, in one embodiment, pump 320 includes a threaded portion 323 such that the rotation of pump 320 will adjust the distance 306 between the IFP 318 and the pump 320.

In one embodiment, the distance 306 between the pump 320 and the IFP 318 can be set to 0 from the factory, for example in contact or very close to being in contact, in order to displace the maximum amount of fluid into the fluid chamber 275.

In one embodiment, this close distance 306 setting would be used in a semi-active configuration. For example, if riding low and using the semi-active configuration, the bleed control valve 390 could be closed in order to rapidly raise vehicle ride height. In contrast, when riding high and using the semi-active configuration, the bleed control valve 390 can be opened slightly to adjust to desired ride height e.g., return to SAG.

Thus, if the location of the distance 306 between the IFP 318 and the pump 320 is changed, the ride height would also be changed. In so doing, changing distance 306 would result in a different ride height SAG setting.

In one embodiment, the distance 306 between the pump 320 and the IFP 318 will be set based an amount of suspension travel. For example, the IFP 318 to pump 320 distance 306 could be 50% of the suspension travel when the shock assembly 100 was at SAG. In this example, the IFP 318 would only engage the pump 320 when the suspension was using more than 50% of travel.

As the shock assembly 100 is in operation, whenever the IFP 318 engages the pump 320, the pump 320 will displace an amount of fluid into the fluid chamber 275. The fluid pumped into the fluid chamber 275 will cause the expansion of the fluid chamber 275. In one embodiment, this expansion will move the spring retainer 267 upward to adjust the suspension back toward the correct geometric ride height (e.g., the established SAG for the vehicle). While this adjustment will not relieve the load on the now somewhat compressed helical spring 115, it will also not increase a fluid pressure in the damping chamber.

In one embodiment, the pumping of fluid into the fluid chamber 275 will continue while the IFP 318 is interacting with the pump 320. Once the IFP 318 disengages from the pump 320, the pump 320 will no longer add fluid to the fluid chamber 275 and the ride height will no longer be raised. For example, in one embodiment, the IFP 318 will disengage from the pump 320 after the suspension travel is reduced to only 30%.

In one embodiment, the fluid in the fluid chamber 275 is subject to a number of different operational configurations. For example, in the passive system mode, the fluid will be released at a predefined rate from the fluid chamber 275 to the fluid reservoir. In the semi-active system mode, the fluid will be, locked into the fluid chamber 275, slowly released from the fluid chamber 275 into the fluid reservoir, or allowed to rapidly return to the reservoir through the flow paths used to provide the fluid from the pump 320 to the fluid chamber 275.

Riding Low

In one embodiment, when weight is added to the vehicle, the overall shock assembly 100 length is shortened at least at the location where the weight is added. This reduction in shock assembly 100 length will result in a lower ride height and the vehicle will no longer be in its SAG configuration.

For example, as shown in FIGS. 2A, 2B, and 3A-3C when weight is added to the vehicle the ride height will be reduced as the suspension spring 115 is compressed a small amount (axial spring length 16 is shortened) and the damping piston 210 moves to a new resting location within main chamber 220 closer to upper eyelet 105 which will move IFP 318 toward pump 320 reducing the distance 306.

In one embodiment, during normal suspension operation (as opposed to a significant suspension event which may exceed the blow off pressure for relief valve 290), for each compression movement of the damping piston (during suspension use), the IFP 318 will make contact with pump 320 causing fluid to be pumped through fluid flow path 255 and into the fluid chamber 275. This addition of fluid into fluid chamber 275 will cause the fluid chamber 275 to expand which will cause spring retainer 267 to move axially along the damping chamber increasing the exposed length 15 of spring retainer 267, and therefore, the overall length of spring preload piston assembly 266. This increase in the overall length of spring preload piston assembly 266 would increase the overall length of shock assembly 100. In other words, it would basically cause a virtual increase in the length of damper housing 120.

In one embodiment, as long as the shock assembly 100 is riding low, IFP 318 will continue to contact pump 320 during compression strokes. This will cause fluid to continue to be pumped into fluid chamber 275, which would further expand the size of fluid chamber 275 and again cause the spring retainer 267 to be hydraulically pushed axial outward once again increasing the overall length of shock assembly 100. By lengthening the shock assembly 100, the ride height would be automatically increased again.

In one embodiment, the automatic pumping process would continue for each compression stroke. However, as the ride height increases, the total amount of fluid pumped by the IFP 318 will be reduced as the IFP 318 will both push less on pump 320 during compression strokes.

In one embodiment, the pumping of fluid into fluid chamber 275 would continue at an incrementally slower pace until the shock assembly 100 returned to SAG, at which point the IFP 318 would no longer be contacting pump 320 during normal compression strokes.

In one embodiment, once the SAG height is reached, if the vehicle is stopped or parked, the check valve 260 may be closed such that the fluid will not leak out of fluid chamber 275, and therefore the ride height will not "sink" over time even if the vehicle is parked.

In one embodiment, if the load was too heavy, the maximum size of fluid chamber 275 could be reached without the shock assembly 100 reaching SAG height. This could be due to the load causing a significant compression to spring 115 and thus the shortening of the axial spring length 16. In this example, once the maximum size (or capacity) of fluid chamber 275 was reached, more fluid would still be being pumped by pump 320 along fluid flow path 255 toward fluid chamber 275. However, since the size of fluid chamber 275 is maximized, in one embodiment, any additional fluid that is pumped along fluid flow path 255 would be released through the fluid relief valve 290 and returned to fluid reservoir 315.

In one embodiment, even if fluid chamber 275 was not full, if the shock assembly 100 were to encounter a significant event causing a large compression, some amount of the fluid pumped through fluid flow path 255 would also be dumped through the fluid relief valve 290.

Riding High

In one embodiment, when the weight is removed from the vehicle, the overall shock assembly 100 length is increased at least at the location where the weight was removed. This increase in shock assembly 100 length will result in a higher ride height and the vehicle will no longer be in its SAG configuration.

For example, using FIGS. 2A, 2B, and 3A-3C, the increase of the shock assembly 100 length due to the removed weight will cause the damping piston 210 and shaft 130 to move to a new resting location within main chamber 220 further away from upper eyelet 105 which will also move IFP 318 away from pump 320 increasing the distance 306.

In one embodiment, during normal suspension operation (as opposed to a significant suspension event which may exceed the blow off pressure for relief valve 290, or a parked vehicle where the fluid in the fluid chamber 275 may be held to maintain a parked ride height), fluid will be released out of the fluid chamber 275 by bleed control valve 390. Once again, since fluid will only be pumped into the fluid chamber 275 when the IFP 318 contacts pump 320. Since this will initially not occur, due to the high ride configuration, the fluid will continue to flow out of the fluid chamber 275 causing the movement of spring retainer 267 into fluid chamber 275.

In one embodiment, the movement of spring retainer 267 into fluid chamber 275 will decrease the exposed length 15 of spring retainer 267, and therefore, the overall length of spring preload piston assembly 266. This reduction in the overall length of spring preload piston assembly 266 would reduce the overall length of shock assembly 100.

In one embodiment, the fluid chamber 275 would continue to contract in size as the fluid drained due to the spring retainer 267 being pushed back into the fluid chamber 275 by the spring force of spring 115.

In one embodiment, the process of draining fluid from fluid chamber 275 would continue to occur until the originally established ride height is reached, or until the IFP 318 started to contact pump 320, and then began pumping fluid back into fluid chamber 275. In so doing, the vehicle will automatically return to the established SAG for the vehicle.

Thus, embodiments provide the ability to automatically maintain the ride height (e.g., the established SAG) of a vehicle. For example, a rider is utilizing a snowmobile and has the suspension ride height SAG tuned for a single rider (e.g., 140 lbs.). At some point, the rider invites a passenger along to also enjoy the sled ride. However, with two riders on the sled, the passenger weight is now (260 lbs.) and the SAG for the vehicle is lowered due to the extra weight.

In one embodiment, by utilizing the automatic ride height adjustment assembly, the system would adjust the fluid volume in fluid chamber 275 as described herein to increase the overall length of the shock assembly and return the snowmobile to the established SAG. Thus, this would return the suspension ride height to a relatively similar SAG as it was set for the solo rider with little or no changes to any damper settings, preload, or the like.

In one embodiment, when the passenger gets off of the sled, the ride height would be higher than the SAG and the system would automatically or manually adjust the fluid volume in fluid chamber 275 (as described herein), thereby returning the ride height to the established SAG. This time, for example, the amount of fluid in fluid chamber 275 would be reduced so that the overall length of shock assembly 100 would be reduced until it reached the appropriate length for the established SAG. Here again the suspension ride height would be returned to an initial SAG, and again with little or no changes to any damper settings, preload adjustments, or the like.

In another example, if the additional weight added to the vehicle resulted in a 10 mm reduction in height from the established SAG, during vehicle operation as described above, the axial length of spring preload piston assembly 266 would be automatically increased until the ride height was returned to the established SAG (e.g., ride height increased by 10 mm-which may or may not be equivalent to the change in shock assembly 100 length due to any angles in the vehicle suspension). As such, the return to SAG would be automatic and would make little or no changes to any damper settings, preload, or the like of shock assembly 100.

Moreover, when the additional weight was removed, the ride height would become higher than the established SAG, during suspension operation as described above, the axial length of spring preload piston assembly 266 would be reduced until the established SAG was reached. As such, the ride height would be automatically return to the proper SAG with little or no changes to any damper settings, preload, or the like of shock assembly 100.

Bottom Out Solution

In one embodiment, the automatic ride height assembly can also be used to provide a bottom out control. That is, the bottom out control can be provided by tuning the surface area of pump 320 and/or adjusting the size of an orifice leaving the pump 320 and going to the fluid chamber 275 thereby creating larger rod reaction forces when IFP 318 engages pump 320. For example, once the IFP 318 engages the pump 320, the pump 320 head cross-sectional area is a function of how much force it takes to move the pump 320. By changing the pump 320 head cross-sectional area, the amount of force needed to move the pump 320 will be changed.

In one embodiment, one or more check tunable orifice(s) 265 in the automatic ride height adjustment system could be opened, widened, narrowed, or closed to provide different pressures necessary to move the fluid from the pump 320 through the fluid chamber 275 flow path to the fluid chamber 275. By adjusting the flow pressure required by the pump 320 to move the fluid through the flow path to the fluid chamber 275, bottom out control can be obtained. For example, bottom out force will increase as preload flow pressure increases. Moreover, by using active valves, automated orifice adjustment, and the like, the automatic ride height adjustment system can provide bottom out control that can be adjusted on the fly. In one embodiment, the bottom out control will change the pressures in the damping chamber.

Relief Valve

In one embodiment, relief valve 290 and/or bleed control valve 390 is configured to provide a rapid pressure dump. In one embodiment, relief valve 290 and/or bleed control valve 390 is configured to provide a rapid pressure dump or a lockout for fluid chamber 275 to prevent a bleed down. In one embodiment, the relief valve 290 and/or bleed control valve 390 provides the working fluid to the fluid reservoir when blow-off occurs.

In one embodiment, any, some, or all of the orifice sizes in the flow path for the automatic ride height adjustment assembly (including check valve 260, check tunable orifice 265, relief valve 290 and/or bleed control valve 390, and the like) are manually adjustable. For example, the orifice size(s) could be adjusted by a party accessing an exterior adjustment feature to manually adjust the one or more orifice sizes.

In one embodiment, the size of one or more orifice in the flow path can be automatically adjusted based on the terrain. For example, on a roadway, the orifice could be at a wider state since the suspension will not likely be encountering a lot of significant travel. In contrast, if the vehicle was operating in a rough environment (e.g., lots of bumps, whoops, or other large and consistent suspension travel events), one or more of the orifices could be reduced (or closed) such that the pump would not provide the same amount of fluid into the fluid chamber to reduce any unnecessary ride height adjustments, e.g., which would also cause unneeded additional spring preload.

Moreover, by using adjustable orifice sizes, check valves, and the like, the ride height will not "sink" over time even if the vehicle is parked. That is, the fluid in the fluid chamber 275 will be held in the chamber without bleed.

In one embodiment, the automatic ride height adjustment assembly can include one of, a combination of, or all of the different available adjustment options. That is, one or more fluid flow path(s) 255 open or closing, check valve 260, the blow-off setting of relief valve 290, the size of check tunable orifice 265, etc. In so doing, the adjustments to the operational characteristics of the automatic ride height adjustment assembly can be almost infinite. Further, the ability to automate the movement and/or opening of the different components and valves can provide significant adjustment capability that can be provided at different times within a single span of a ride. Moreover, if an extreme event is realized, the excess pressure in fluid chamber 275 could be automatically reduced using relief valve 290 and/or bleed control valve 390. In one embodiment, the released fluid will be released back to the fluid reservoir 315.

In one embodiment, any, some, or all of the orifice sizes and/or the flow paths for the automatic ride height adjustment assembly (including check valve 260, check tunable orifice 265, relief valve 290 and/or bleed control valve 390, and the like) are non-active valves, e.g., a manual valve that may be adjustable but is not electronically adjustable.

In one embodiment, any, some, or all of the orifice sizes and/or the flow paths for the automatic ride height adjustment assembly (including check valve 260, check tunable orifice 265, relief valve 290 and/or bleed control valve 390, and the like) are automatically adjustable such as via the use of an active valve 450.

In one embodiment, any, some, or all of the orifice sizes and/or the flow paths for the automatic ride height adjustment assembly (including check valve 260, check tunable orifice 265, relief valve 290 and/or bleed control valve 390, and the like) are a mix of active and non-active valves.

Example Active Valve

Figure 4:
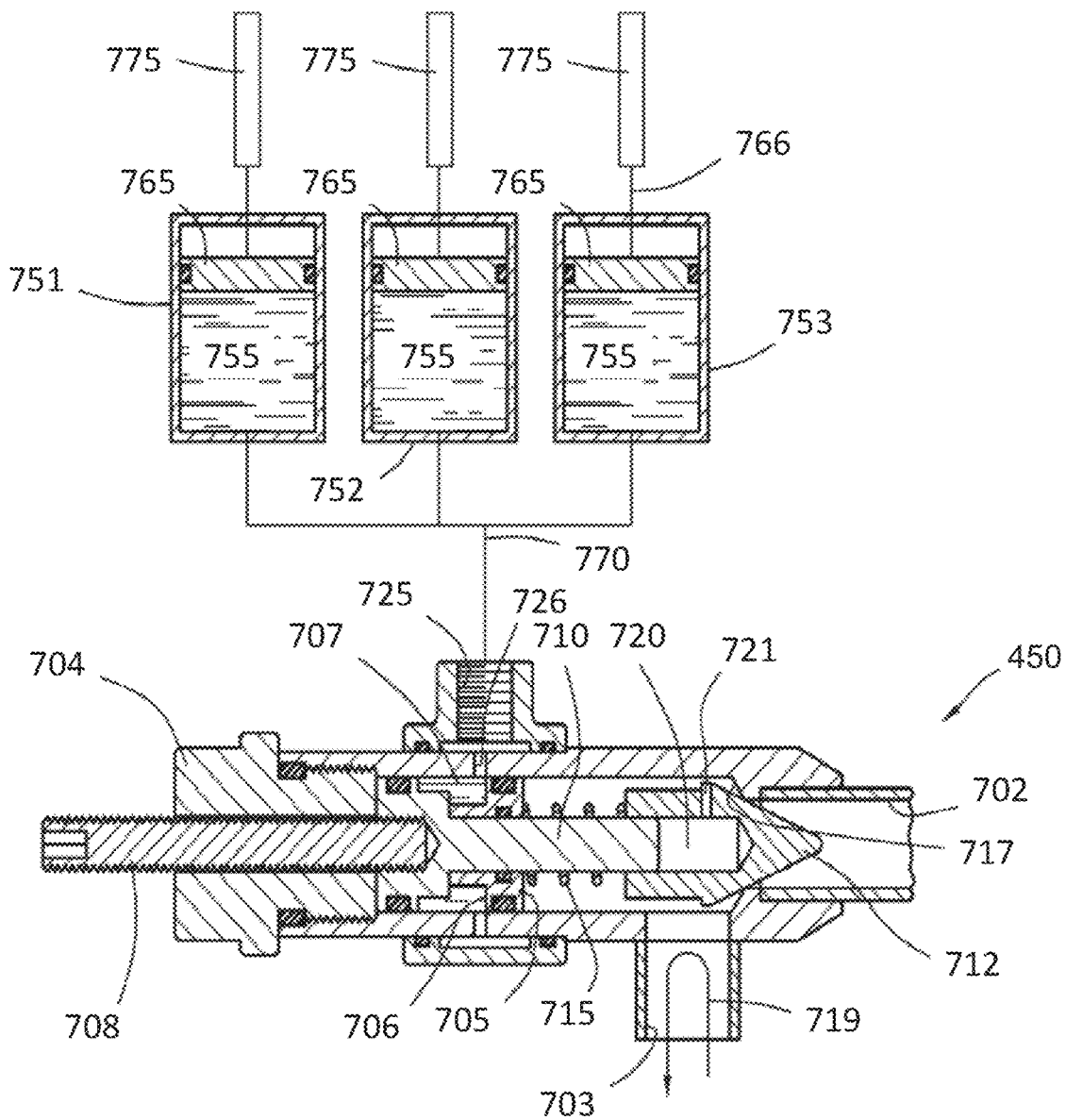
FIG. 4 is an enlarged section view showing an active valve and a plurality of valve operating cylinders in selective communication with an annular piston surface of the valve, in accordance with an embodiment.

Referring now to FIG. 4, an enlarged view of an active valve 450 is shown in accordance with an embodiment.

In the following discussion, the term "active", as used when referring to a valve or damping component, means adjustable, manipulatable, etc., during typical operation of the valve. For example, an active valve can have its operation changed to thereby alter a corresponding damping characteristic from a "soft" damping setting to a "firm" damping setting by, for example, adjusting a switch in a passenger compartment of a vehicle. Additionally, it will be understood that in some embodiments, an active valve may also be configured to automatically adjust its operation, and corresponding damping characteristics, based upon, for example, operational information pertaining to the vehicle and/or the suspension with which the valve is used. Similarly, it will be understood that in some embodiments, an active valve may be configured to automatically adjust its operation, and corresponding damping characteristics, to provide damping based upon received user input settings (e.g., a user-selected "comfort" setting, a user-selected "sport" setting, and the like). Additionally, in many instances, an "active" valve is adjusted or manipulated electronically (e.g., using a powered solenoid, or the like) to alter the operation or characteristics of a valve and/or other component. As a result, in the field of suspension components and valves, the terms "active", "electronic", "electronically controlled", and the like, are often used interchangeably.

In the following discussion, the term "manual" as used when referring to a valve or damping component means manually adjustable, physically manipulatable, etc., without requiring disassembly of the valve, damping component, or suspension damper which includes the valve or damping component. In some instances, the manual adjustment or physical manipulation of the valve, damping component, or suspension damper, which includes the valve or damping component, occurs when the valve is in use. For example, a manual valve may be adjusted to change its operation to alter a corresponding damping characteristic from a "soft" damping setting to a "firm" damping setting by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension"). In a conventional "pure active suspension", a motive source such as, for example, an actuator, is used to move (e.g. raise or lower) a wheel with respect to the vehicle. In a "semi-active suspension", no motive force/actuator is employed to adjust move (e.g. raise or lower) a wheel with respect to the vehicle. Rather, in a "semi-active suspension", the characteristics of the suspension (e.g. the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to adjust move (e.g. raise or lower) a wheel with respect to the vehicle. As such, it will be understood that an "active valve", as defined above, is well suited for use in a "pure active suspension" or a "semi-active suspension".

Although FIG. 4 shows the active valve 450 in a closed position (e.g. during a rebound stroke of the damper), the following discussion also includes the opening of active valve 450. Active valve 450 includes a valve body 704 housing a movable piston 705 which is sealed within the body. The piston 705 includes a sealed chamber 707 adjacent an annularly-shaped piston surface 706 at a first end thereof. The chamber 707 and annular piston surface 706 are in fluid communication with a port 725 accessed via opening 726. Two additional fluid communication points are provided in the body including an inlet orifice 702 and an outlet orifice 703 for fluid passing through the active valve 450.

Extending from a first end of the piston 705 is a shaft 710 having a cone-shaped nipple 712 (other shapes such as spherical or flat, with corresponding seats, will also work suitably well) disposed on an end thereof. The nipple 712 is telescopically mounted relative to, and movable on, the shaft 710 and is biased toward an extended position due to a spring 715 coaxially mounted on the shaft 710 between the nipple 712 and the piston 705. Due to the spring biasing, the nipple 712 normally seats itself against a seat 717 formed in an interior of the valve body 704.

As shown, the nipple 712 is seated against seat 717 due to the force of the spring 715 and absent an opposite force from fluid entering the active valve 450 along orifice 702. As nipple 712 telescopes out, a gap 720 is formed between the end of the shaft 710 and an interior of nipple 712. A vent 721 is provided to relieve any pressure formed in the gap. With a fluid path through the active valve 450 (from 703 to 702) closed, fluid communication is substantially shut off from the rebound side of the cylinder into the valve body (and hence to the compression side) and its "dead-end" path is shown by arrow 719.

In one embodiment, there is a manual pre-load adjustment on the spring 715 permitting a user to hand-load or un-load the spring using a threaded member 708 that transmits motion of the piston 705 towards and away from the conical member, thereby changing the compression on the spring 715.

Also shown in FIG. 4 is a plurality of valve operating cylinders 751, 752, 753. In one embodiment, the cylinders each include a predetermined volume of fluid 755 that is selectively movable in and out of each cylindrical body through the action of a separate corresponding piston 765 and rod 766 for each cylindrical body. A fluid path 770 runs between each cylinder and port 725 of the valve body where annular piston surface 706 is exposed to the fluid.

Because each cylinder has a specific volume of substantially incompressible fluid and because the volume of the sealed chamber 707 adjacent the annular piston surface 706 is known, the fluid contents of each cylinder can be used, individually, sequentially or simultaneously to move the piston a specific distance, thereby effecting the damping characteristics of the system in a relatively predetermined and precise way.

While the cylinders 751-753 can be operated in any fashion, in the embodiment shown each piston 765 and rod 766 is individually operated by a solenoid 775 and each solenoid, in turn, is operable from a remote location of the vehicle, like a cab of a motor vehicle or even the handlebar area of a motor or bicycle (not shown). Electrical power to the solenoids 775 is available from an existing power source of a vehicle or is supplied from its own source, such as on-board batteries. Because the cylinders may be operated by battery or other electric power or even manually (e.g. by syringe type plunger), there is no requirement that a so-equipped suspension rely on any pressurized vehicle hydraulic system (e.g. steering, brakes) for operation. Further, because of the fixed volume interaction with the bottom out valve there is no issue involved in stepping from hydraulic system pressure to desired suspension bottom out operating pressure.

In one embodiment, e.g., when active valve 450 is in the damping-open position, fluid flow through orifice 702 provides adequate force on the nipple 712 to urge it backwards, at least partially loading the spring 715 and creating a fluid flow path from the orifice 702 into and through orifice 703.

The characteristics of the spring 715 are typically chosen to permit active valve 450 (e.g. nipple 712) to open at a predetermined pressure, with a predetermined amount of control pressure applied to port 725. For a given spring 715, higher control pressure at port 725 will result in higher pressure required to open the active valve 450 and correspondingly higher damping resistance in orifice 702. In one embodiment, the control pressure at port 725 is raised high enough to effectively "lock" the active valve closed resulting in a substantially rigid compression damper (particularly true when a solid damping piston is also used).

In one embodiment, the valve is open in both directions when the nipple 712 is "topped out" against valve body 704. In another embodiment however, when the valve piston 705 is abutted or "topped out" against valve body 704 the spring 715 and relative dimensions of the active valve 450 still allow for the nipple 712 to engage the valve seat 717 thereby closing the valve. In such embodiment backflow from the rebound side to the compression side is always substantially closed and cracking pressure from flow along orifice 702 is determined by the pre-compression in the spring 715. In such embodiment, additional fluid pressure may be added to the inlet through port 725 to increase the cracking pressure for flow along orifice 702 and thereby increase compression damping. It is generally noteworthy that while the descriptions herein often relate to compression damping and rebound shut off, some or all of the channels (or channel) on a given suspension unit may be configured to allow rebound damping and shut off or impede compression damping.

While the examples illustrated relate to manual operation and automated operation based upon specific parameters, in various embodiments, active valve 450 can be remotely-operated and can be used in a variety of ways with many different driving and road variables and/or utilized at any point during use of a vehicle. In one example, active valve 450 is controlled based upon vehicle speed in conjunction with the angular location of the vehicle's steering wheel. In this manner, by sensing the steering wheel turn severity (angle of rotation), additional damping (by adjusting the corresponding size of the opening of orifice 702 by causing nipple 712 to open, close, or partially close orifice 702) can be applied to one shock assembly or one set of vehicle shock assemblies on one side of the vehicle (suitable for example to mitigate cornering roll) in the event of a sharp turn at a relatively high speed.

In another example, a transducer, such as an accelerometer, measures other aspects of the vehicle's suspension system, like axle force and/or moments applied to various parts of the vehicle, like steering tie rods, and directs change to position of active valve 450 (and corresponding change to the working size of the opening of orifice 702 by causing nipple 712 to open, close, or partially close orifice 702) in response thereto. In another example, active valve 450 is controlled at least in part by a pressure transducer measuring pressure in a vehicle tire and adding damping characteristics to some or all of the wheels (by adjusting the working size of the opening of orifice 702 by causing nipple 712 to open, close, or partially close orifice 702) in the event of, for example, an increased or decreased pressure reading. In one embodiment, active valve 450 is controlled in response to braking pressure (as measured, for example, by a brake pedal (or lever) sensor or brake fluid pressure sensor or accelerometer). In still another example, a parameter might include a gyroscopic mechanism that monitors vehicle trajectory and identifies a "spin-out" or other loss of control condition and adds and/or reduces damping to some or all of the vehicle's dampers (by adjusting the working size of the opening of orifice 702 by causing nipple 712 to open, close, or partially close orifice 702 chambers) in the event of a loss of control to help the operator of the vehicle to regain control.

For example, active valve 450, when open, permits a first flow rate of the working fluid through orifice 702. In contrast, when active valve 450 is partially closed, a second flow rate of the working fluid though orifice 702 occurs. The second flow rate is less than the first flow rate but greater than no flow rate. When active valve 450 is completely closed, the flow rate of the working fluid though orifice 702 is statistically zero.

In one embodiment, instead of (or in addition to) restricting the flow through orifice 702, active valve 450 can vary a flow rate through an inlet or outlet passage within the active valve 450, itself. See, as an example, the electronic valve of FIGS. 2-4 of U.S. Pat. No. 9,353,818 which is incorporated by reference herein, in its entirety, as further example of different types of "electronic" or "active" valves). Thus, the active valve 450, can be used to meter the working fluid flow (e.g., control the rate of working fluid flow) with/or without adjusting the flow rate through orifice 702.

Due to the active valve 450 arrangement, a relatively small solenoid (using relatively low amounts of power) can generate relatively large damping forces. Furthermore, due to incompressible fluid inside the shock assembly 100, damping occurs as the distance between nipple 712 and orifice 702 is reduced. The result is a controllable damping rate. Certain active valve features are described and shown in U.S. Pat. Nos. 9,120,362; 8,627,932; 8,857,580; 9,033,122; and 9,239,090 which are incorporated herein, in their entirety, by reference.

It should be appreciated that when the body 704 rotates in a reverse direction than that described above and herein, the nipple 712 moves away from orifice 702 providing at least a partially opened fluid path.

Figure 5:
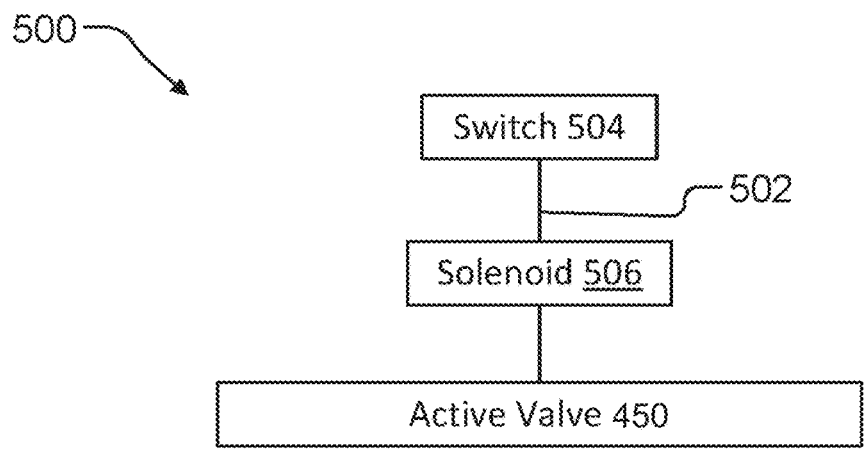
FIG. 5 is a schematic diagram showing a control arrangement for an active valve, in accordance with an embodiment.

FIG. 5 is a schematic diagram showing a control arrangement 500 for a remotely-operated active valve 450. As illustrated, a signal line 502 runs from a switch 504 to a solenoid 506. Thereafter, the solenoid 506 converts electrical energy into mechanical movement and rotates body 704 within active valve 450, In one embodiment, the rotation of body 704 causes an indexing ring consisting of two opposing, outwardly spring-biased balls to rotate among indentions formed on an inside diameter of a lock ring.

As the body 704 rotates, nipple 712 at an opposite end of the valve is advanced or withdrawn from an opening in orifice 702. For example, the body 704 is rotationally engaged with the nipple 712. A male hex member extends from an end of the body 704 into a female hex profile bore formed in the nipple 712. Such engagement transmits rotation from the body 704 to the nipple 712 while allowing axial displacement of the nipple 712 relative to the body 704. Therefore, while the body does not axially move upon rotation, the threaded nipple 712 interacts with mating threads formed on an inside diameter of the bore to transmit axial motion, resulting from rotation and based on the pitch of the threads, of the nipple 712 towards or away from an orifice 702, between a closed position, a partially open position, and a fully or completely open position.

Adjusting the opening of orifice 702 modifies the flowrate of the fluid through active valve 450 thereby varying the stiffness of a corresponding shock assembly 100. While FIG. 5 is simplified and involves control of a single active valve 450, it will be understood that any number of active valves corresponding to any number of fluid channels (e.g., bypass channels, external reservoir channels, bottom out channels, etc.) for a corresponding number of vehicle suspension dampers could be used alone or in combination. That is, one or more active valves could be operated simultaneously or separately depending upon needs in a vehicular suspension system. For example, a suspension damper could have one, a combination of, or each of an active valve(s): for a bottom out control, an internal bypass, for an external bypass, for a fluid conduit to the external reservoir 125, etc. In other words, anywhere there is a fluid flow path within a shock assembly 100, an active valve could be used. Moreover, the active valve could be alone or used in combination with other active valves at other fluid flow paths to automate one or more of the damping performance characteristics of the damping assembly. Moreover, additional switches could permit individual operation of separate active bottom out valves.

Figure 6:
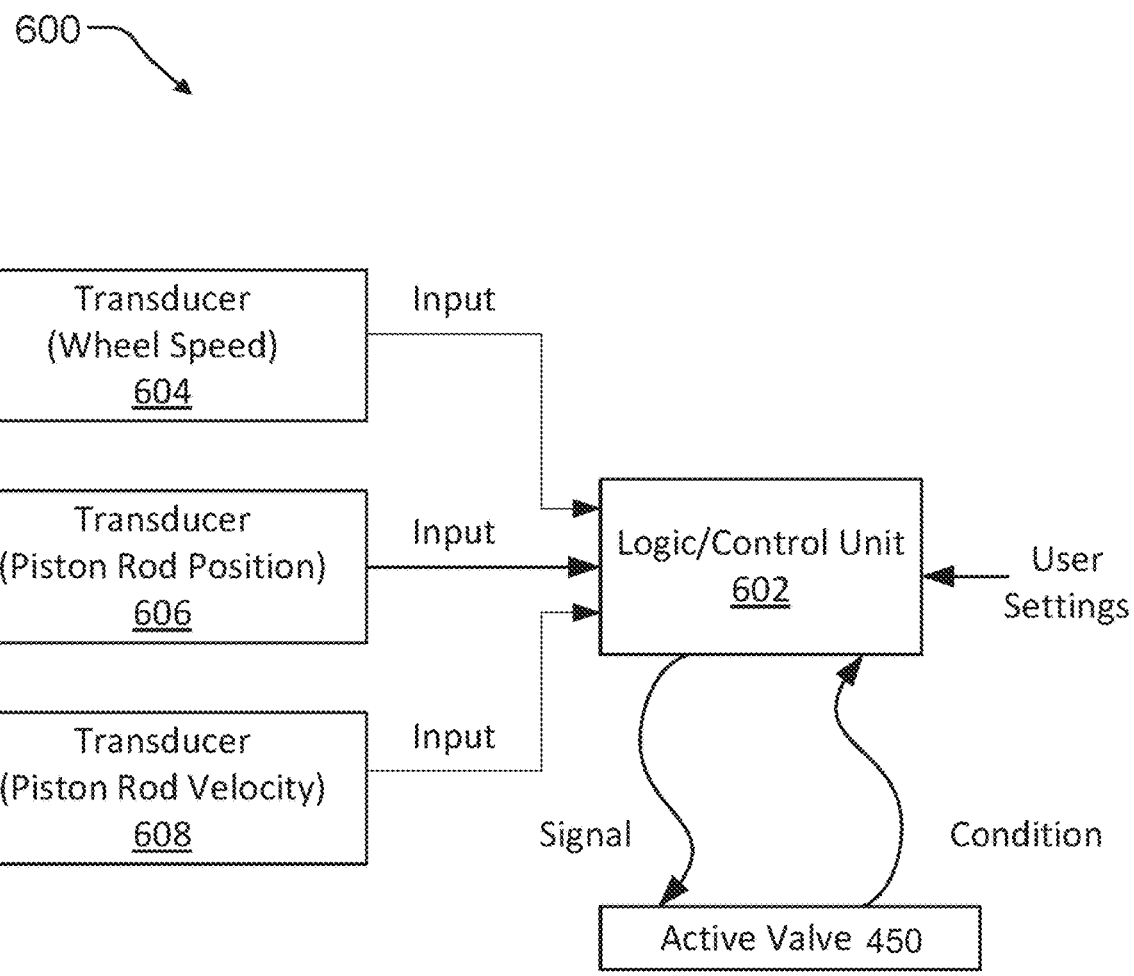
FIG. 6 is a schematic diagram of a control system based upon any or all of vehicle speed, damper rod speed, and damper rod position, in accordance with an embodiment.

In addition to, or in lieu of, the simple, switch-operated remote arrangement of FIG. 5, the remotely-operable active valve 450 can be operated automatically based upon one or more driving conditions, and/or automatically or manually utilized at any point during use of a vehicle. FIG. 6 shows a schematic diagram of a control system 600 based upon any or all of vehicle speed, damper rod speed, and damper rod position. One embodiment of the arrangement of FIG. 6 is designed to automatically increase damping in a shock assembly in the event a damper rod reaches a certain velocity in its travel towards the bottom end of a damper at a predetermined speed of the vehicle. In one embodiment, the control system 600 adds damping (and control) in the event of rapid operation (e.g. high rod velocity) of the shock assembly 100 to avoid a bottoming out of the damper rod as well as a loss of control that can accompany rapid compression of a shock assembly with a relative long amount of travel. In one embodiment, the control system 600 adds damping (e.g., adjusts the size of the opening of orifice 702 by causing nipple 712 to open, close, or partially close orifice 702) in the event that the rod velocity in compression is relatively low but the rod progresses past a certain point in the travel.

Such configuration aids in stabilizing the vehicle against excessive low-rate suspension movement events such as cornering roll, braking and acceleration yaw and pitch and "g-out."

FIG. 6 illustrates, for example, a control system 600 including three variables: wheel speed, corresponding to the speed of a vehicle component (measured by wheel speed transducer 604), piston rod position (measured by piston rod position transducer 606), and piston rod velocity (measured by piston rod velocity transducer 608). Any or all of the variables shown may be considered by logic unit 602 in controlling the solenoids or other motive sources coupled to active valve 450 for changing the working size of the opening of orifice 702 by causing nipple 712 to open, close, or partially close orifice 702. Any other suitable vehicle operation variable may be used in addition to or in lieu of the variables discussed herein, such as, for example, piston rod compression strain, eyelet strain, vehicle mounted accelerometer (or tilt/inclinometer) data or any other suitable vehicle or component performance data.

In one embodiment, the piston's position within the damping chamber is determined using an accelerometer to sense modal resonance of the suspension damper. Such resonance will change depending on the position of the piston and an on-board processor (computer) is calibrated to correlate resonance with axial position. In one embodiment, a suitable proximity sensor or linear coil transducer or other electro-magnetic transducer is incorporated in the damping chamber to provide a sensor to monitor the position and/or speed of the piston (and suitable magnetic tag) with respect to a housing of the suspension damper.

In one embodiment, the magnetic transducer includes a waveguide and a magnet, such as a doughnut (toroidal) magnet that is joined to the cylinder and oriented such that the magnetic field generated by the magnet passes through the rod and the waveguide. Electric pulses are applied to the waveguide from a pulse generator that provides a stream of electric pulses, each of which is also provided to a signal processing circuit for timing purposes. When the electric pulse is applied to the waveguide, a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines.

By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, which is digital or analog, proportional to the calculated distance and/or velocity. A transducer-operated arrangement for measuring piston rod speed and velocity is described in U.S. Pat. No. 5,952,823 and that patent is incorporated by reference herein in its entirety.

While transducers located at the suspension damper measure piston rod velocity (piston rod velocity transducer 608), and piston rod position (piston rod position transducer 606), a separate wheel speed transducer 604 for sensing the rotational speed of a wheel about an axle includes housing fixed to the axle and containing therein, for example, two permanent magnets. In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118 which is incorporated herein by reference in its entirety.

In one embodiment, as illustrated in FIG. 6, the logic unit 602 with user-definable settings receives inputs from piston rod position transducer 606, piston rod velocity transducer 608, as well as wheel speed transducer 604. Logic unit 602 is user-programmable and, depending on the needs of the operator, logic unit 602 records the variables and, then, if certain criteria are met, logic unit 602 sends its own signal to active valve 450 (e.g., the logic unit 602 is an activation signal provider) to cause active valve 450 to move into the desired state (e.g., adjust the flow rate by adjusting the distance between nipple 712 and orifice 702). Thereafter, the condition, state or position of active valve 450 is relayed back to logic unit 602 via an active valve monitor or the like.

In one embodiment, logic unit 602 shown in FIG. 6 assumes a single active valve 450 corresponding to a single orifice 702 of a single shock assembly 100, but logic unit 602 is usable with any number of active valves or groups of active valves corresponding to any number of orifices, or groups of orifices. For instance, the suspension dampers on one side of the vehicle can be acted upon while the vehicles other suspension dampers remain unaffected.

It should be appreciated that the automatically adjustable ride height capability discussed herein could be incorporated into a shock assembly like FIGS. 1 and 2A-2C, or in another embodiment, into a shock assembly with more, fewer, or different components than those shown in FIGS. 1 and 2A-2C. Moreover, the automatically adjustable ride height capability disclosed herein could be used on one or more shock assemblies across an assortment of vehicles such as, but not limited to a bicycle, motorcycle, ATV, jet ski, car, snow mobile, side-by-side, and the like.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What we claim is:

1. A shock assembly comprising:
a main chamber comprising a working fluid therein;
a damping piston coupled to a piston shaft, said damping piston disposed in said main chamber to divide said main chamber into a compression side fluid chamber and a rebound side fluid chamber;
an automatic ride height adjustment assembly comprising:
an internal floating piston (IFP) pump assembly; and
a spring preload piston assembly;
said IFP pump assembly comprises:
an IFP to separate said working fluid from a compressible fluid in an IFP fluid chamber;
a pump fixedly located within said IFP fluid chamber;
a fluid reservoir to provide said working fluid to said pump, said working fluid in said fluid reservoir fluidly separated from said working fluid in said main chamber; and
a fluid pathway to provide said working fluid from said pump to said spring preload piston assembly
said pump comprises:
a pump body;
a post fixedly coupled with and extended from said pump body toward said IFP, wherein a distance from an end of said post to said IFP establishes a sag ride height; and
a pump chamber to receive said working fluid from said fluid reservoir, said pump chamber configured to pump said working fluid through said fluid pathway to said spring preload piston assembly when said post and said pump body are pressed into said pump chamber.

2. The shock assembly of claim 1, wherein said shock assembly is a monotube shock assembly and said IFP pump assembly is disposed in said compression side fluid chamber of said main chamber.

3. The shock assembly of claim 1, wherein said shock assembly is a piggyback shock assembly comprising:
a remote reservoir; and
said IFP pump assembly is disposed in said remote reservoir.

4. The shock assembly of claim 1 further comprising:
said post being adjustably coupled with said pump body to adjustably change a length of the post that is extended from said pump body toward said IFP, wherein a distance from an end of said post to said IFP can be adjusted by said change in said length of the post that is extended from said pump body to modify said sag ride height.

5. The shock assembly of claim 1 wherein a compression stroke of said damping piston causes said IFP to contact said post and press said post and said pump body into said pump chamber.

6. The shock assembly of claim 5 wherein after said compression stroke, a rebound stroke of said damping piston causes said IFP to move away from said post and allow said post and said pump body to withdraw from said pump chamber.

7. The shock assembly of claim 1 further comprising:
a check tunable orifice, wherein said fluid reservoir provides said working fluid to said pump via said check tunable orifice.

8. The shock assembly of claim 7 wherein said check tunable orifice is adjustably configurable to limit a refill speed of said working fluid from said fluid reservoir to said pump.

9. The shock assembly of claim 1 wherein said spring preload piston assembly comprises:
a fluid chamber in fluid communication with a fluid pathway of said IFP pump assembly; and
a spring retainer that extends from a portion of said fluid chamber, said spring retainer axially adjustable along said main chamber, such that a change in an amount of said working fluid in said fluid chamber automatically changes a length of the spring retainer that extends from said fluid chamber which changes a ride height of said shock assembly.

10. The shock assembly of claim 9, wherein when said working fluid is added to said fluid chamber said fluid chamber is configured to expand and push the spring retainer a further length out of said fluid chamber to cause an increase in said ride height of said shock assembly.

11. The shock assembly of claim 9, further comprising:
a bleed control valve configured to allow at least some of said working fluid to be released from said fluid chamber,
wherein when said at least some of said working fluid is released from said fluid chamber, said fluid chamber is configured to contract and reduce the length of said spring retainer that extends out of said fluid chamber to cause a decrease in said ride height of said shock assembly.

12. The shock assembly of claim 11, wherein said bleed control valve is a passive valve.

13. The shock assembly of claim 11, wherein said bleed control valve is a semi-active valve.

14. The shock assembly of claim 9, further comprising
a fluid relief valve configured to provide a rapid fluid dump when an amount of fluid greater than an available volume of said fluid chamber is pumped from said IFP pump assembly to said fluid chamber, and when a compression event causes said working fluid in said fluid chamber to surpass a pre-established blow-off value.

15. A monotube shock assembly comprising:
a main chamber comprising a working fluid therein;
a damping piston coupled to a piston shaft, said damping piston disposed in said main chamber to divide said main chamber into a compression side fluid chamber and a rebound side fluid chamber; and
an automatic ride height adjustment assembly comprising:
an internal floating piston (IFP) pump assembly comprising:
an IFP to separate said working fluid from a compressible fluid in an IFP fluid chamber;
a pump fixedly located within said IFP fluid chamber;
a fluid reservoir to provide said working fluid for said pump, said working fluid in said fluid reservoir fluidly separated from said working fluid in said main chamber;
a check tunable orifice adjustably configurable to limit a refill speed of said working fluid provided from said fluid reservoir to said pump; and
a fluid pathway to provide said working fluid from said pump to a spring preload piston assembly; and
a spring preload piston assembly comprising:
a fluid chamber in fluid communication with said IFP pump assembly; and
a spring retainer that extends from a portion of said fluid chamber, said spring retainer axially adjustable along said main chamber, such that a change in an amount of said working fluid in said fluid chamber automatically changes a length of the spring retainer that extends from said fluid chamber which changes a ride height of said monotube shock assembly.

16. The monotube shock assembly of claim 15 wherein said pump comprises:
a pump body;
a post to adjustably extend from said pump body toward said IFP, wherein a distance from an end of said post to said IFP is based on an established sag ride height; and
a pump chamber to receive said working fluid from said fluid reservoir, said pump chamber configured to pump said working fluid through said fluid pathway to said spring preload piston assembly when said post and said pump body are pressed into said pump chamber.

17. A piggyback shock assembly comprising:
a main chamber comprising a working fluid therein;
a damping piston coupled to a piston shaft, said damping piston disposed in said main chamber to divide said main chamber into a compression side fluid chamber and a rebound side fluid chamber;
a remote reservoir; and
an automatic ride height adjustment assembly comprising:
an internal floating piston (IFP) pump assembly disposed in said remote reservoir, said IFP pump assembly comprising:
an IFP to separate said working fluid from a compressible fluid in an IFP fluid chamber;
a pump fixedly located within said IFP fluid chamber;
a fluid reservoir to provide said working fluid for said pump, said working fluid in said fluid reservoir fluidly separated from said working fluid in said main chamber;
a check tunable orifice adjustably configurable to limit a refill speed of said working fluid provided from said fluid reservoir to said pump; and
a fluid pathway to provide said working fluid from said pump to a spring preload piston assembly; and
a spring preload piston assembly about an exterior of said main chamber, said spring preload piston assembly comprising:
a fluid chamber in fluid communication with said IFP pump assembly; and
a spring retainer that extends from a portion of said fluid chamber, said spring retainer axially adjustable along said main chamber, such that a change in an amount of said working fluid in said fluid chamber automatically changes a length of the spring retainer that extends from said fluid chamber which changes a ride height of said piggyback shock assembly.

18. The piggyback shock assembly of claim 17 wherein said pump comprises:
a pump body;
a post to adjustably extend from said pump body toward said IFP, wherein a distance from an end of said post to said IFP is based on an established sag ride height; and
a pump chamber to receive said working fluid from said fluid reservoir, said pump chamber configured to pump said working fluid through said fluid pathway to said spring preload piston assembly when said post and said pump body are pressed into said pump chamber.

* * * * *